US007703047B2

(12) United States Patent
Keely, Jr. et al.

(10) Patent No.: US 7,703,047 B2
(45) Date of Patent: Apr. 20, 2010

(54) PEN-BASED INTERFACE FOR A NOTEPAD COMPUTER

(75) Inventors: Leroy Bertrand Keely, Jr., Portola Valley, CA (US); Douglas Alan Young, Mountain View, CA (US); Andrew James Palay, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/121,977

(22) Filed: May 5, 2005

(65) Prior Publication Data

US 2005/0204305 A1 Sep. 15, 2005

Related U.S. Application Data

(62) Division of application No. 10/011,713, filed on Dec. 11, 2001, now Pat. No. 7,032,187, which is a division of application No. 09/196,100, filed on Nov. 20, 1998, now Pat. No. 6,337,698.

(51) Int. Cl.
*G06F 3/033* (2006.01)
*G06F 3/01* (2006.01)

(52) U.S. Cl. .................. 715/863; 715/769; 715/773; 715/831; 715/857

(58) Field of Classification Search ............... 715/711, 715/731, 858, 773, 794, 831, 863–864, 857, 715/769; 382/175, 177, 179, 188–189, 314; 708/141, 146; 345/649–659
See application file for complete search history.

(56) References Cited

U.S. PATENT DOCUMENTS 3,947,842 A 3/1976 Hilsum et al.

(Continued)

FOREIGN PATENT DOCUMENTS

JP 06019612 1/2006

OTHER PUBLICATIONS

Apple Press, Newton 2.0 User Interface Guidelines, Addison-Wesley Publishing Company, pp. 1-1 to 8-32.
John Jerney, Fujitsu Stylistic 1000, Hardware Review, pp. 1-4, Jun. 1996.

*Primary Examiner*—Ba Huynh
*Assistant Examiner*—Nicholas Augustine
(74) *Attorney, Agent, or Firm*—Lee & Hayes, PLLC

(57) ABSTRACT

A notepad computer with a page display region displaying a page of a document on which a user can write using a pen or stylus type writing tool is provided. Associated with the page is an interface that can be used with the pen. The interface includes a core task tool region adjacent to the page where tool icons are partially visible until the pen is brought near one of the icons. The tool icon becomes fully visible when the pen is within the region of the icon. The tool when activated can pop-up a radial pop-up menu located at an edge of the document where all the menu choices are located in a semi-circle away from the edge so that the users hand while holding the pen and making a selection does not block the choices. A page flipping tool is located in a corner of the page and is an explicit two-stroke menu allowing selection of a next or previous page. A page scrolling tool is located along an edge of the page, the scrolling tool when activated is an implicit button allowing scrolling in one implied direction. The interface also includes a stack region adjacent to said page display region having one or more stack icons each representing a stack of documents. The icon is also an explicit two-stroke radial pop-up menu having forward and backward choices for selecting documents in the stack and a stack document list display displaying a list of documents in the stack when the stack icon is touched by an input pen. The interface also includes a typing tool overlaying a portion of the page and including a writing zone where a user handwrites strokes and, a page zone comprising part of the page where typed text corresponding to the handwritten strokes is displayed as the handwriting occurs.

6 Claims, 22 Drawing Sheets

U.S. PATENT DOCUMENTS

| | | | |
|---|---|---|---|
| 4,835,347 A | 5/1989 | Watson | |
| 4,868,351 A | 9/1989 | Watanabe et al. | |
| 4,939,318 A | 7/1990 | Watson et al. | |
| 5,194,852 A | 3/1993 | More et al. | |
| 5,218,173 A | 6/1993 | Garwin et al. | |
| 5,220,649 A | 6/1993 | Forcier | |
| 5,237,651 A | 8/1993 | Randall | |
| 5,239,489 A | 8/1993 | Russell | |
| 5,247,198 A | 9/1993 | Homma et al. | |
| RE34,476 E * | 12/1993 | Norwood | 382/186 |
| 5,333,255 A | 7/1994 | Damouth | |
| 5,347,295 A * | 9/1994 | Agulnick et al. | 345/156 |
| 5,347,477 A * | 9/1994 | Lee | 708/141 |
| 5,351,995 A | 10/1994 | Booker | |
| 5,367,623 A | 11/1994 | Iwai et al. | |
| 5,381,160 A | 1/1995 | Landmeier | |
| 5,389,745 A * | 2/1995 | Sakamoto | 178/18.03 |
| 5,392,387 A | 2/1995 | Fitzpatrick et al. | |
| 5,410,334 A | 4/1995 | Comerford | |
| 5,418,549 A | 5/1995 | Anderson et al. | |
| 5,434,370 A | 7/1995 | Wilson et al. | |
| 5,436,725 A | 7/1995 | Ledger | |
| 5,438,662 A | 8/1995 | Randall | |
| 5,463,725 A | 10/1995 | Henckel et al. | |
| 5,481,666 A | 1/1996 | Nguyen et al. | |
| 5,502,803 A * | 3/1996 | Yoshida et al. | 715/201 |
| 5,523,775 A | 6/1996 | Capps | |
| 5,524,201 A | 6/1996 | Shwarts et al. | |
| 5,555,354 A | 9/1996 | Strasnick et al. | |
| 5,559,944 A | 9/1996 | Ono | |
| 5,583,543 A * | 12/1996 | Takahashi et al. | 345/173 |
| 5,596,699 A | 1/1997 | Driskell | |
| 5,617,114 A | 4/1997 | Bier et al. | |
| 5,619,431 A | 4/1997 | Oda | |
| 5,623,612 A | 4/1997 | Haneda et al. | |
| 5,627,348 A | 5/1997 | Berkson et al. | |
| 5,652,806 A * | 7/1997 | Friend | 382/175 |
| 5,664,128 A | 9/1997 | Bauer | |
| 5,673,406 A | 9/1997 | Hirayama | |
| 5,689,667 A | 11/1997 | Kurtenbach | |
| 5,689,669 A | 11/1997 | Lynch et al. | |
| 5,704,050 A | 12/1997 | Redpath | |
| 5,721,287 A | 2/1998 | Nohr et al. | |
| 5,721,853 A | 2/1998 | Smith | |
| 5,737,443 A * | 4/1998 | Guzik et al. | 382/188 |
| 5,737,557 A | 4/1998 | Sullivan | |
| 5,742,287 A | 4/1998 | Lection et al. | |
| 5,745,116 A | 4/1998 | Pisutha-Arnond | |
| 5,745,715 A | 4/1998 | Pickover et al. | |
| 5,745,716 A | 4/1998 | Tchao et al. | |
| 5,748,110 A | 5/1998 | Sekizawa et al. | |
| 5,828,360 A * | 10/1998 | Anderson et al. | 715/834 |
| 5,862,256 A * | 1/1999 | Zetts et al. | 382/187 |
| 5,864,330 A | 1/1999 | Haynes | |
| 5,864,635 A * | 1/1999 | Zetts et al. | 382/187 |
| 5,870,092 A | 2/1999 | Bedford-Roberts | |
| 5,884,330 A | 3/1999 | Erlich | |
| 5,903,666 A * | 5/1999 | Guzik et al. | 382/179 |
| 5,926,178 A | 7/1999 | Kurtenbach | |
| 5,933,141 A | 8/1999 | Smith | |
| 5,981,884 A * | 11/1999 | Sato et al. | 178/19.01 |
| 6,002,398 A | 12/1999 | Wilson | |
| 6,002,401 A | 12/1999 | Baker | |
| 6,046,743 A | 4/2000 | Stenton | |
| 6,047,743 A | 4/2000 | Byrd | |
| 6,088,481 A * | 7/2000 | Okamoto et al. | 382/189 |
| 6,144,380 A | 11/2000 | Shwarts et al. | |
| 6,226,404 B1 * | 5/2001 | Ikebata | 382/187 |
| 6,239,489 B1 | 5/2001 | Jiang | |
| 6,323,859 B1 * | 11/2001 | Gantt | 345/419 |
| 6,336,125 B2 | 1/2002 | Noda et al. | |
| 6,381,160 B1 | 4/2002 | Sauerlander et al. | |
| 6,408,092 B1 * | 6/2002 | Sites | 382/187 |
| 6,462,733 B1 | 10/2002 | Murakami | |
| 6,579,324 B1 | 6/2003 | Lowry et al. | |
| 6,618,063 B1 | 9/2003 | Kurtenbach | |
| 6,753,890 B2 | 6/2004 | Sanbe | |
| 6,917,373 B2 | 7/2005 | Vong et al. | |
| 6,986,106 B2 | 1/2006 | Soin et al. | |
| 7,030,837 B1 | 4/2006 | Vong et al. | |
| 7,058,902 B2 | 6/2006 | Iwema et al. | |
| 7,111,788 B2 | 9/2006 | Reponen | |
| 7,137,076 B2 | 11/2006 | Iwema et al. | |
| 7,145,555 B2 | 12/2006 | Taylor et al. | |
| 7,174,042 B1 | 2/2007 | Simmons et al. | |
| 7,185,278 B1 | 2/2007 | Simmons | |
| 7,188,309 B2 | 3/2007 | Simmons et al. | |
| 7,227,511 B2 | 6/2007 | Adan et al. | |
| 7,259,752 B1 | 8/2007 | Simmons | |
| 7,263,657 B2 | 8/2007 | Soin et al. | |
| 7,283,127 B2 | 10/2007 | Taylor et al. | |
| 7,290,219 B2 | 10/2007 | Boyles et al. | |
| 7,330,195 B2 | 2/2008 | Li | |
| 7,358,965 B2 | 4/2008 | Barabe et al. | |
| 2002/0180797 A1 | 12/2002 | Bachmann | |
| 2003/0006975 A1 | 1/2003 | Moriya et al. | |
| 2004/0135824 A1 | 7/2004 | Fitzmaurice | |
| 2004/0141010 A1 | 7/2004 | Fitzmaurice et al. | |
| 2004/0217947 A1 | 11/2004 | Fitzmaurice et al. | |
| 2005/0050476 A1 | 3/2005 | SanGiovanni | |
| 2007/0067738 A1 | 3/2007 | Flynt et al. | |

* cited by examiner

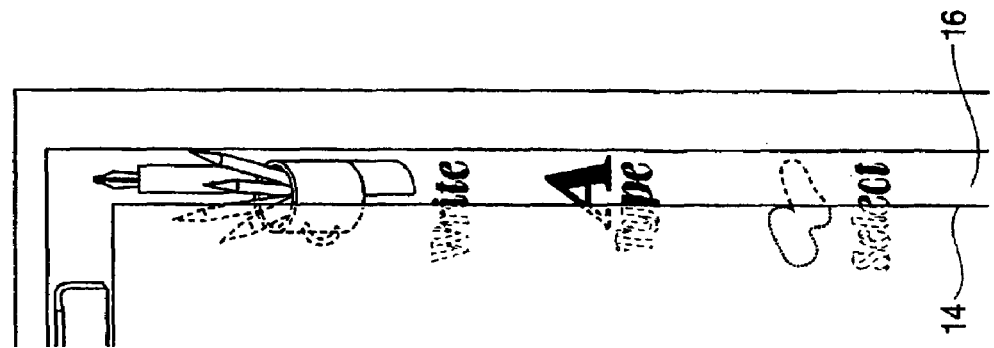
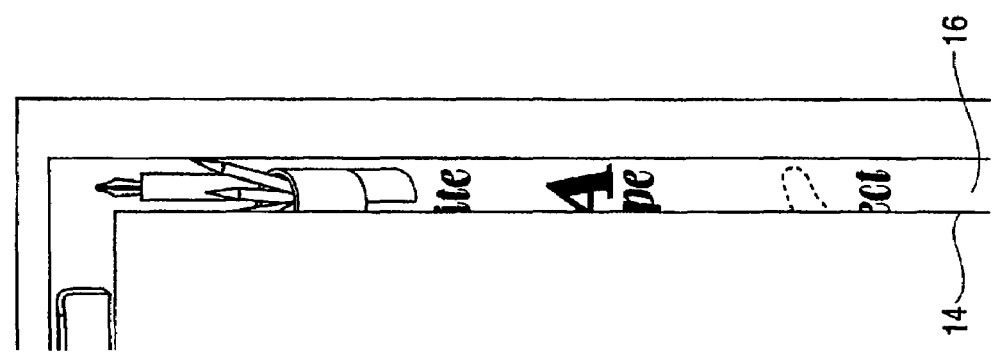
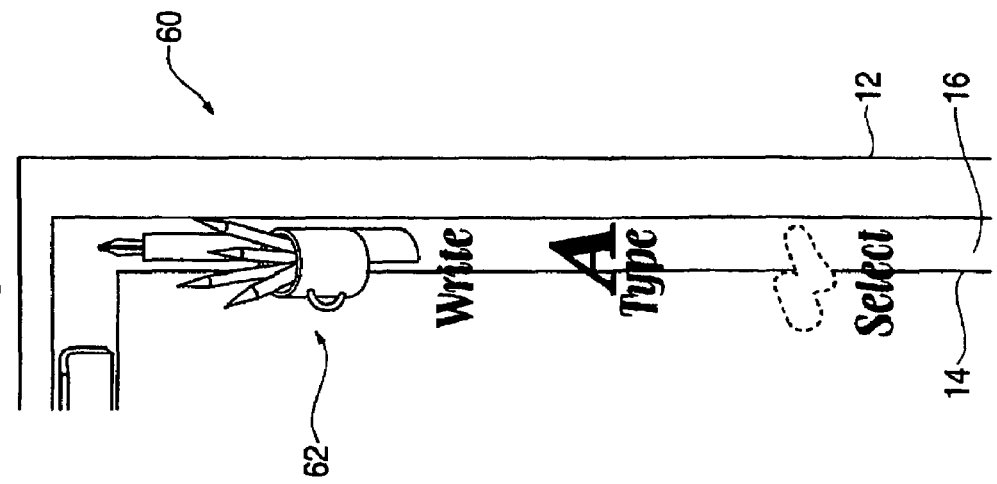

FIG. 8
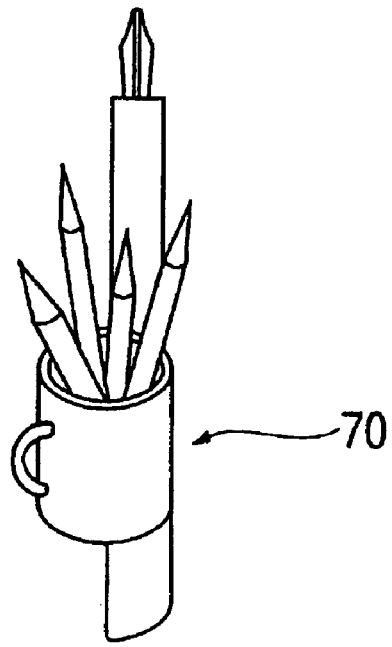
Write
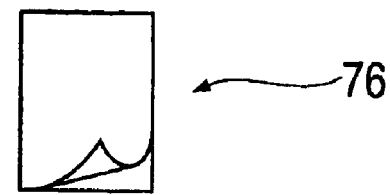
New
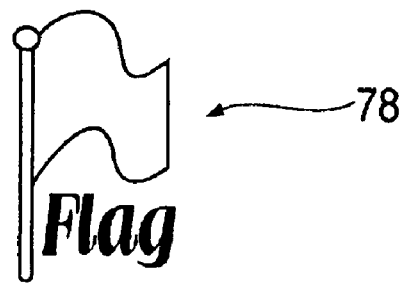
Flag
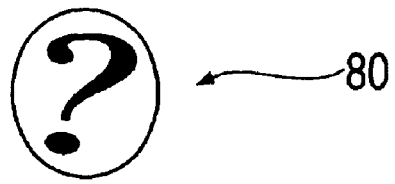
Type
Find
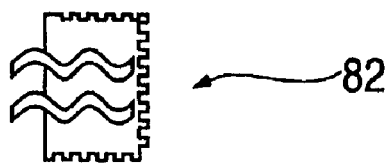
Select
Send

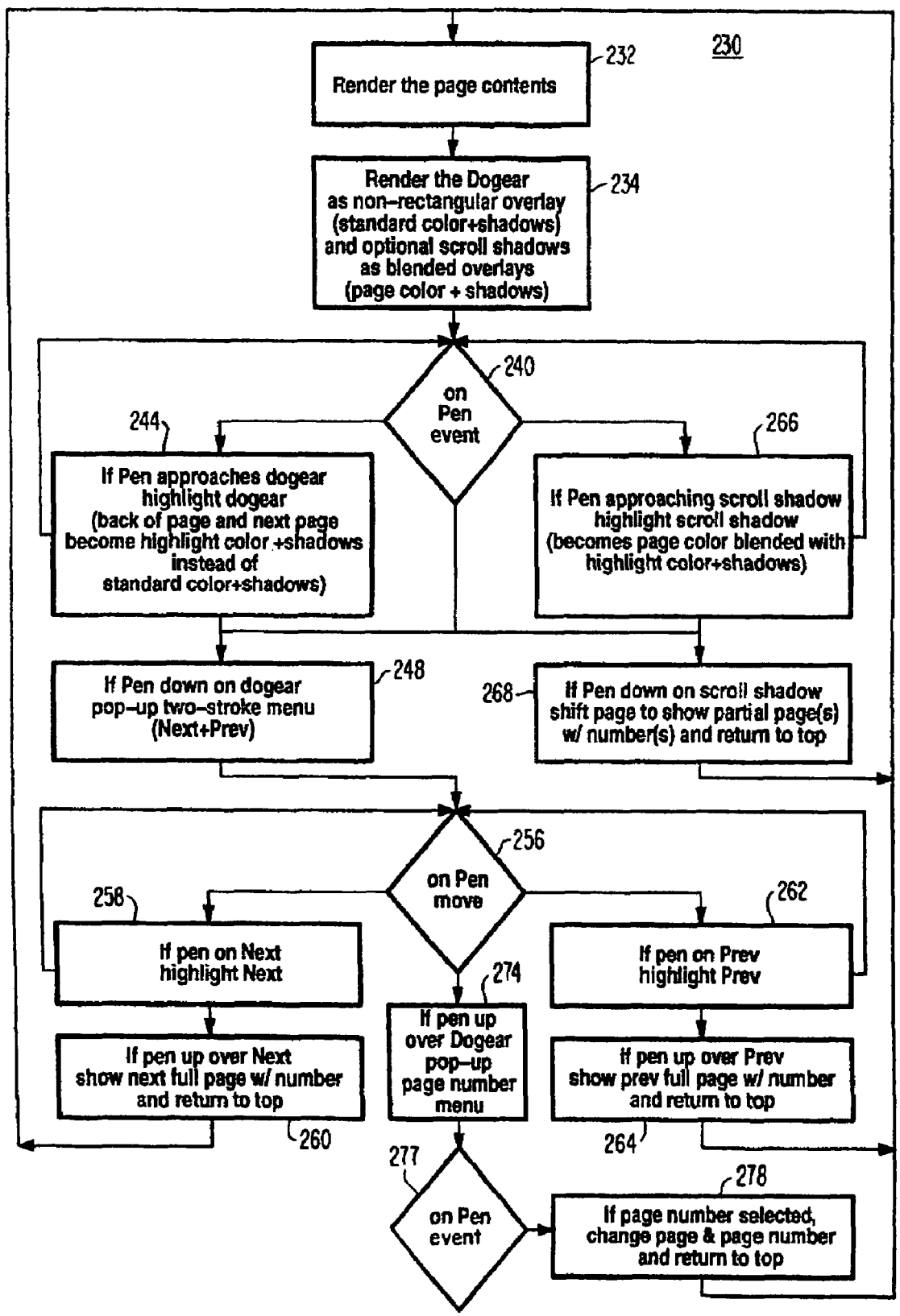

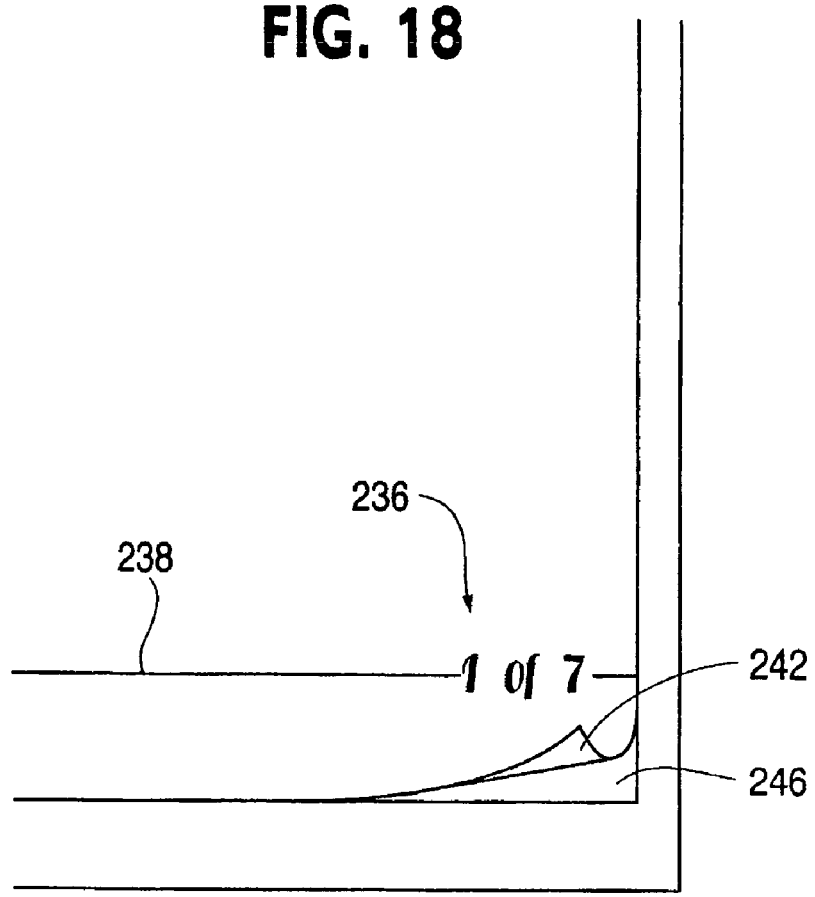
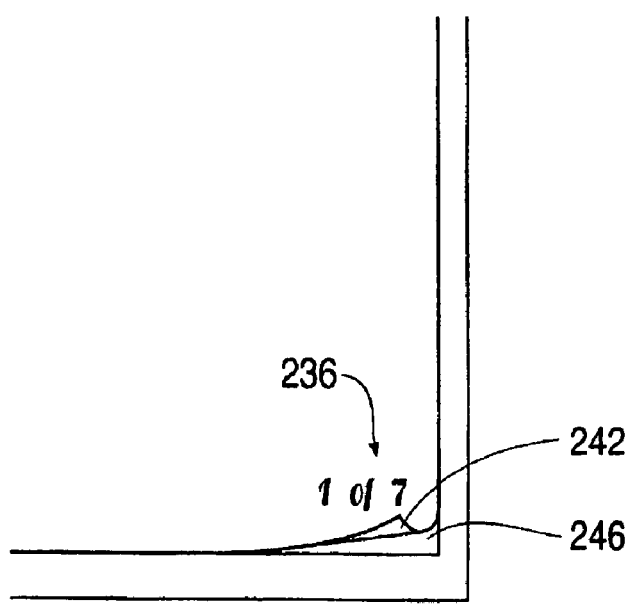

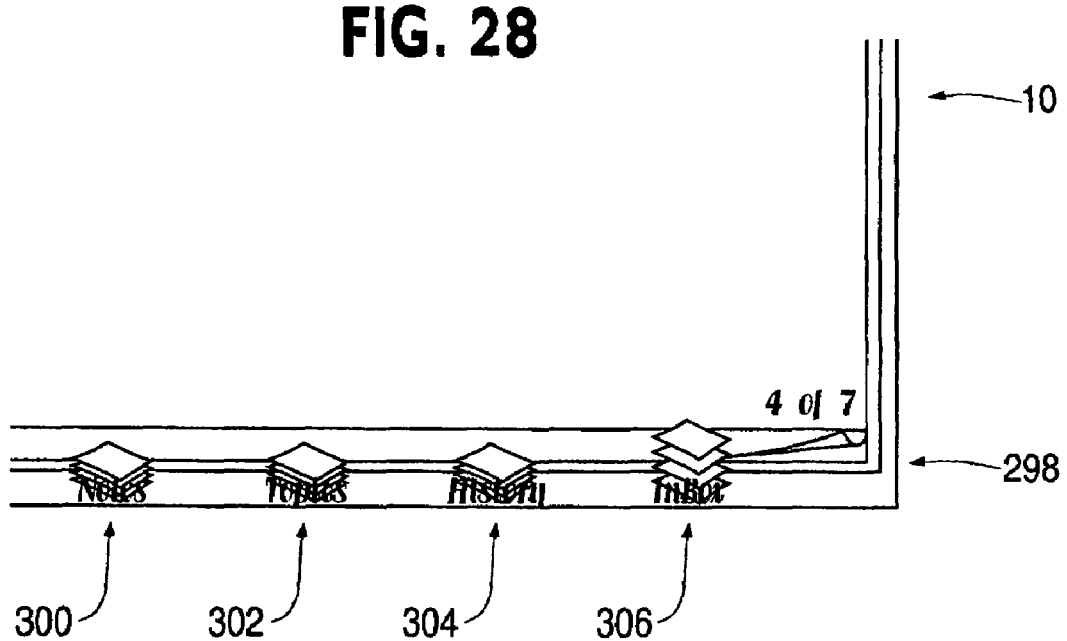
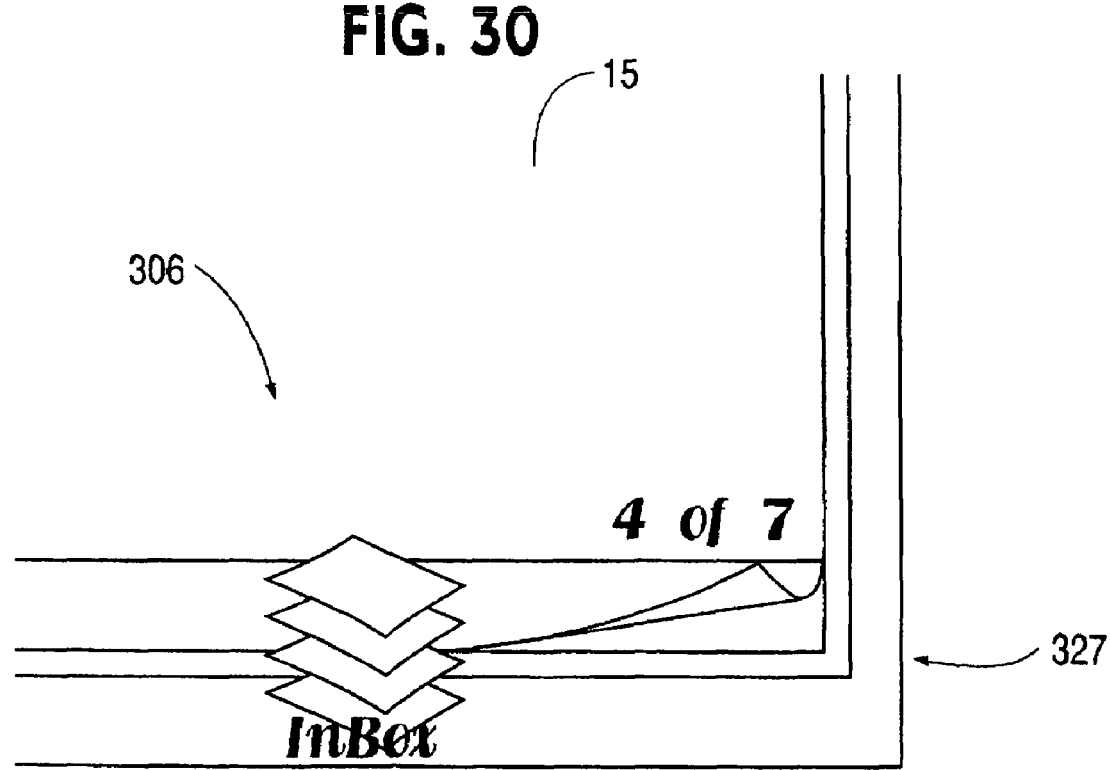

A flowchart of the process for using a stack for multiple documents. (A stack is the purest representation of set of documents put in sequence to save space and ease later access.)

1. Content is the primary object of the system
2. Direct interaction with content is most natural
3. The pen is the most powerful tool for direct interaction
4. Other contents and tools must respect the above
5. All important objects should be recognizable.
6. And always visible
7. And in a consistent place 4 of 7

Back Forward
Notes Topics History Index

FIG. 34

You can slide the ribbon up to edit this line — 366
You can edit this line now.

| ABC | abc | Tab | — 362 |
| !@# | 123 | Enter | — 364 |

364 ←

368
364  364

PEN-BASED INTERFACE FOR A NOTEPAD COMPUTER

CROSS REFERENCE TO RELATED APPLICATIONS

This application is a divisional application of prior U.S. patent application Ser. No. 10/011,713, filed Dec. 11, 2001, which is a divisional application of prior U.S. application Ser. No. 09/196,100 filed Nov. 20, 1998 (now U.S. Pat. No. 6,337, 698, issued Jan. 8, 2002), the contents of which are incorporated herein by reference.

BACKGROUND OF THE INVENTION

1. Field of the Invention

The present invention is directed to a notepad or notebook computer interface that facilitates input via a pen and, more particularly, to a system that provides interface elements particularly suitable for pen-based input to, and interaction with, electronic documents.

2. Description of the Related Art

Making electronic information as handy as paper requires an interaction model which is somewhat different than conventional systems. Documents, the primary form in which people obtain and produce information, are most familiar and manipulatable in the form of paper pages. What is needed is a notepad or notebook computer based system that allows the easy manipulation of document pages. Marking on documents directly, with a pen, provides the most leverage of human motor skills for adding to and interacting with documents. What is needed is a pen based method of marking on and interacting with documents within a notepad or notebook computer.

Organizing information for recall is best done according to one's own experience and mental associations, i.e. "when, where I saw it last", and "what I think it's related to." What is needed is a system that will organize documents according to the user's experience and mental model.

Such a device and its software needs to: render in pages, favoring a portrait aspect ratio and dedicating as much of the screen as possible to displaying the page; support tasks via transitional user interface (U/I) elements which may appear inside or outside or overlapping with the page, and which are controlled directly with the tip of the actual pen (there is no other representation of the pen's location) taking into account the users left or Right-handedness, with appearance and behaviors that are both obvious and unobtrusive, Easy-to learn and efficient; and support the layering of ink and transitional U/I elements over the content in ways that minimize obstruction of the content and include presentation of such transitional elements in a way which exploits the viewer's ability to resolve overlapping and translucent images. Additionally, the system must support text entry via the pen, but not let the conversion of pen input to text impede the perceived natural flow of events.

A notebook computer should behave and allow interaction with it in a manner similar to interaction with a paper notebook. Likewise, a notepad computer should behave and allow interaction with it in a manner similar to interaction with a paper notepad. For example, when flipping pages of paper the user can separate a corner of the page from a stack to make it easier to flip. The position of the user within a stack of pages of a paper is readily visible via looking at the edge of the stack. A paper user can change pens (inks) with the simple motion of picking up another pen. What is needed is an interface that provides such functions simply and intuitively.

SUMMARY OF THE INVENTION

It is an object of the present invention to provide user interface elements along a side of the page that allow the behavior of the system to be changed in a pop-up mode and that do not obscure the page.

It is another object of the present invention to provide input menu pallets that consider the relation of the user's hand to the page, to the corresponding side edge of the display, and to limited numbers and types of selections.

It is also an object of the present invention to provide a page region specifically designated for flipping the pages, but to otherwise allow the user to mark pages directly for input.

It is a further object of the present invention to provide both an ability to convert handwriting to text after the writing, and a writing region adjacent to which converted text characters appear on the page during the writing, in specific relation to the writing region.

It is an additional object of the present invention to allow documents to be stacked and manipulated with a simple unambiguous organizational metaphor.

It is another object of the present invention to provide a system where both the location and orientation of the pen act to determine its function.

The above objects can be attained by a system that includes a page display region displaying a page of a document on which a user can write using a pen or stylus type writing tool. The page occupies substantially all of the display region. Associated with the page is an interface that can be used with the pen. The interface includes a core task tool region adjacent to the page where tool icons are partially visible until the pen is brought near one of the icons, at which time it becomes fully visible. The icons can pop-up radial marking menus located near an edge of the document where all the menu choices are located in a semi-circle away from the edge, so that the user's hand, while holding the pen and making a selection, does not block the choices. A page flipping tool is located in a corner of the page and is a two-stroke radial marking pop-up menu limiting the menu choices to opposite directions of pen movement and allowing selection of a next or previous page. A page scrolling tool can optimally be located along each edge of the page and allows scrolling in each appropriate direction. The interface also includes a stack region adjacent to the page display region having one or more stack icons each representing a stack of documents. Each stack icon is also a two-stroke radial pop-up marking menu having forward and backward choices for selecting documents in the stack. The interface also includes a typing tool which can overlay a portion of the page and includes a writing zone where a user handwrites text, and an adjacent page zone which is part of the page where typed text corresponding to the handwritten strokes is displayed as the handwriting occurs.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 illustrates core task tools fully visible.

FIGS. 7A and 7B illustrate core task tools partially hidden.

FIG. 8 depicts preferred core task tool icons.

FIG. 16 illustrates a page flipping process.

FIG. 18 shows the page flipping tool activated.

FIG. 19 shows the page flipping tool without the optional scrolling shadow.

FIG. 28 depicts stacks.

FIG. 30 shows a highlighted stack tool.

FIG. 33 depicts a stack index listing.

FIG. 34 shows a typing tool.

DESCRIPTION OF THE PREFERRED EMBODIMENTS

Figure 1:
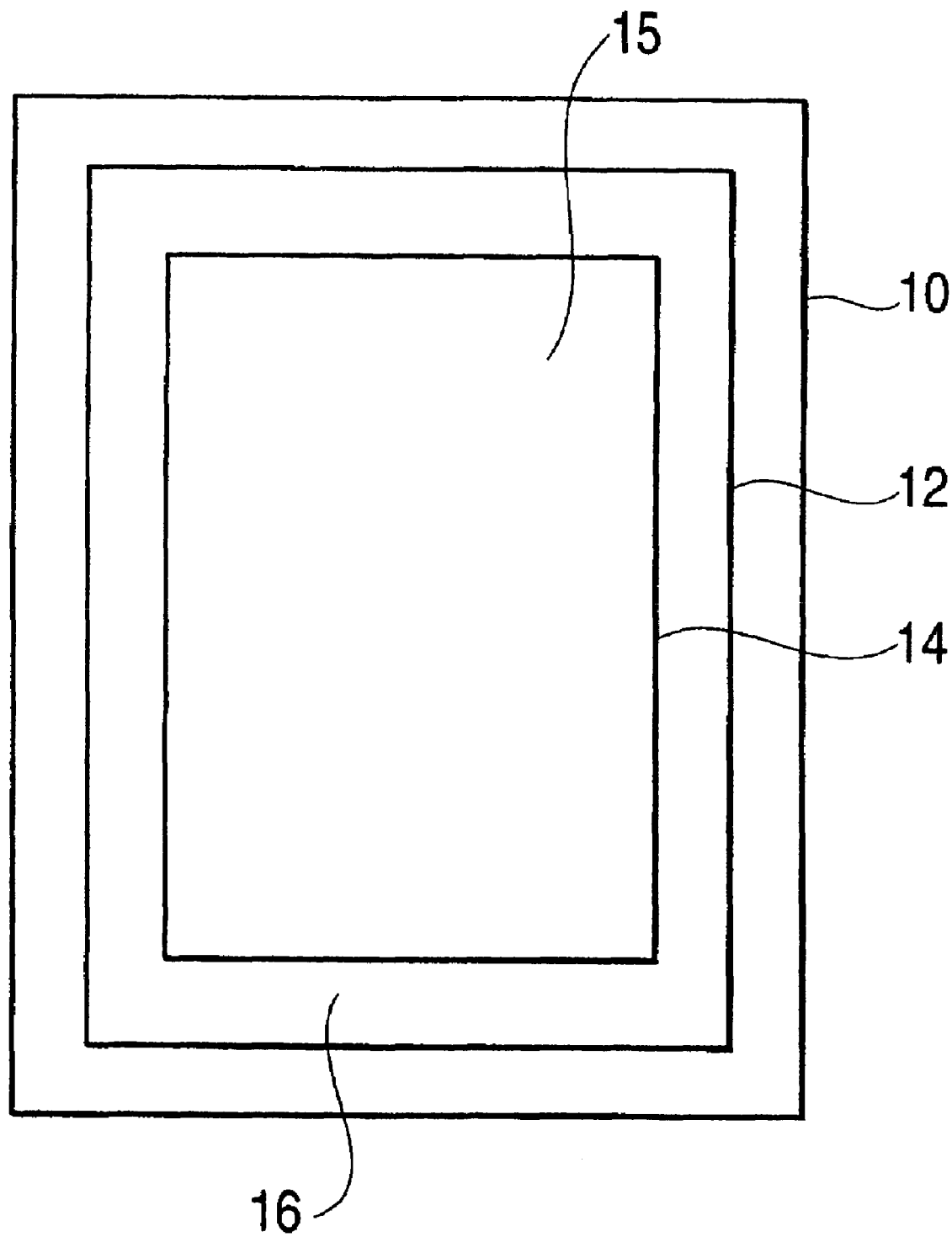
FIG. 1 illustrates a display with a "paper" display area and tool region.

The present invention is directed to interface elements of a pen based, notepad or notebook computer, the hardware of which is described in detail in the related application previously mentioned. The notebook or notepad computer includes a liquid crystal display 10, as depicted in FIG. 1, with a display area 12 of a size and shape approximating a piece of paper. The border 14 of a writing surface or the "paper" 15 is slightly inset from one or more edges of the display area 12, so that there is a display region 16 around the edge of the paper where tools or status indicators can be partially or fully displayed.

Figure 5:
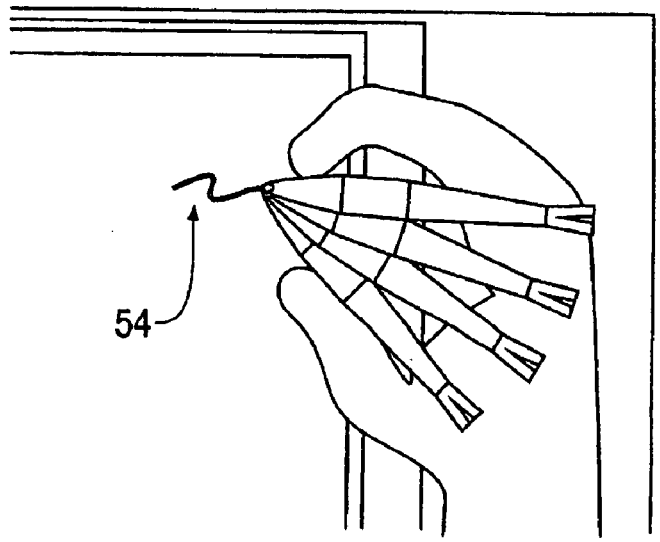
FIG. 5 depicts writing.

An important attribute of an interface to a pen-based system, such as in the present invention, is the combination of spatial and gestural cues by which it deduces how the input should be processed. In the present invention, pen samples are, by default, used to write (see 33—FIG. 5) on the "paper" page 15, and optionally used to select elements of the page, enter text, or select core task tools along the edge of the page. The present invention uses three types of cues to dependably switch between modes.

Figure 2:
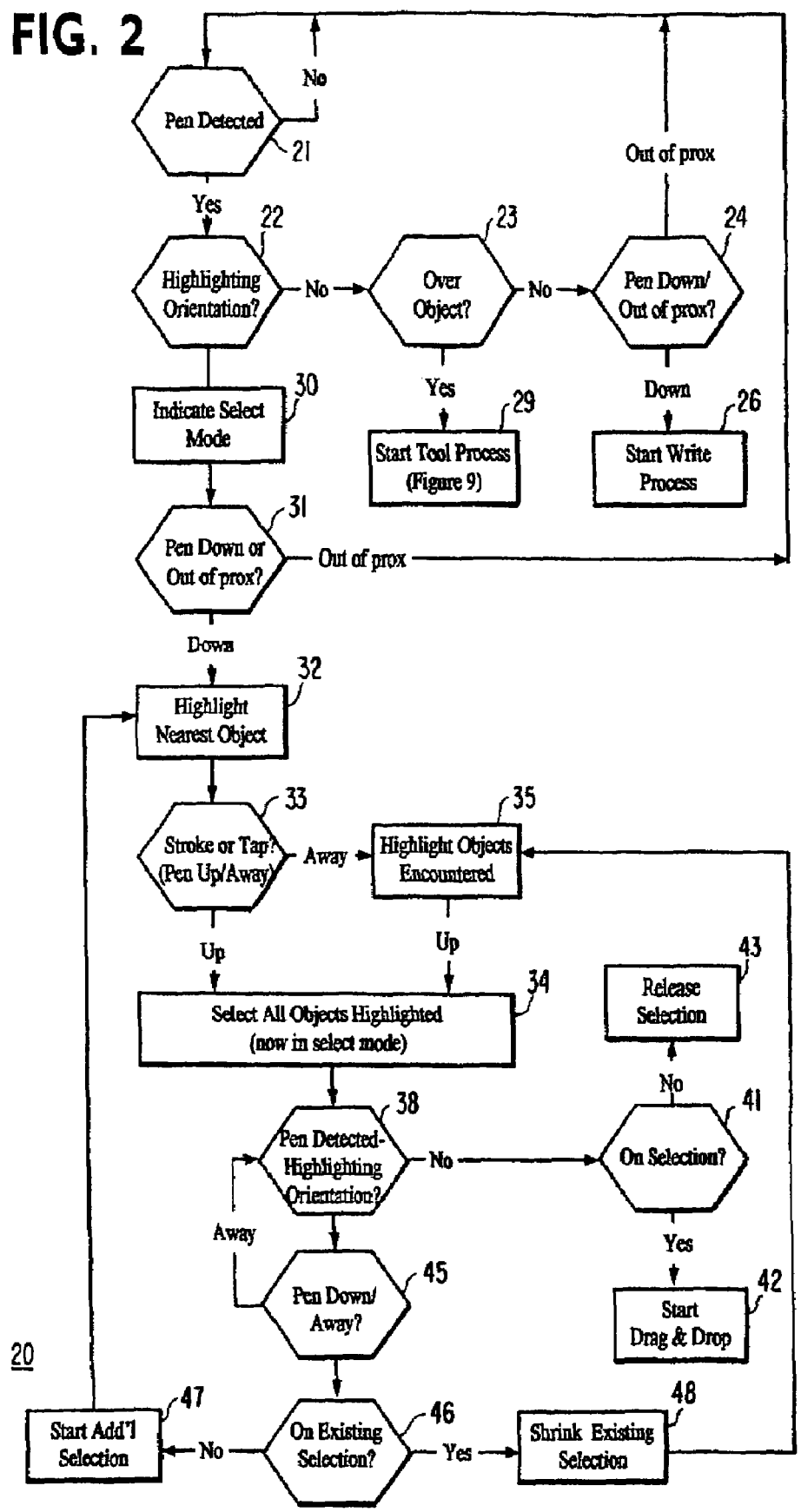
FIG. 2 depicts a selection process.

In a first mode switch, as depicted by the process 20 in FIG. 2, a selection can be started implicitly by pen location, whenever the pen is held near a displayed element which is known or set by the system to support selection. In a second mode switch, a selection can be started implicitly by rotating the pen to a selection orientation, such as whenever the pen is pointed towards the bottom of the page. In a third mode switch, a selection can be started explicitly by tapping a select icon (see FIG. 3), then stopped only by tapping the select icon while in select mode, in which case any current selection is released.

Figure 9:
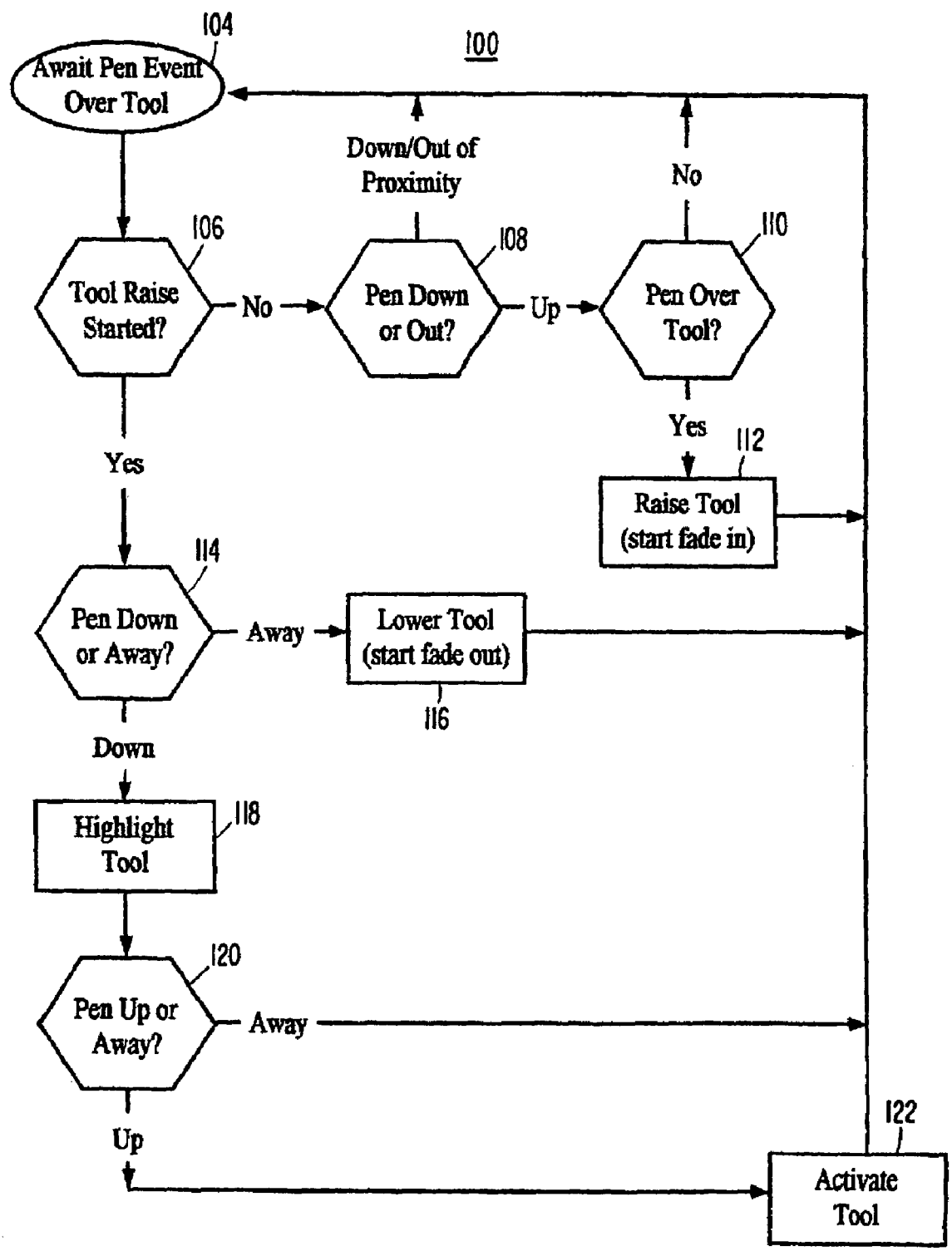
FIG. 9 illustrates a process of the present invention.

As depicted in FIG. 2, when a pen is detected 21 the orientation of the pen is determined 22. If the orientation is not the selection orientation, the system determines 23 whether the pen is over or within a predetermined threshold distance or region of an object. An object is any information or interface element which represents a process. When over an object in this condition, the system starts 29 a tool process as depicted in FIG. 9. When not in the region of the object 24, the write process is started 26.

Figure 3:
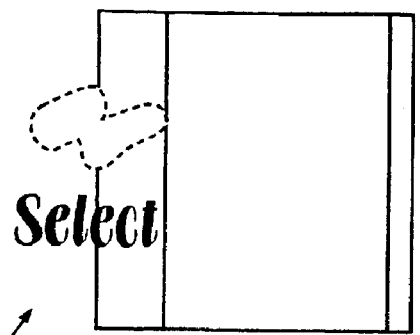
FIG. 3 shows an activated Select icon.

When the pen is detected in the selection orientation, the system indicates 30 the select mode by highlighting the select icon (see FIG. 3). If the pen is moved out of proximity to the object 31, the wait for the pen detection starts again. When the pen comes down in the select mode, the object nearest the pen is highlighted 32. Highlighting changes the appearance of the displayed information or interface element so that it stands out, as if highlighted by a yellow or other colored marker. One of the objects can be selected 33 by a tap or a stroke. A selection associates a highlighted information element with an action to be subsequently performed. If the pen comes down on the object or element with a tap, the system selects 34 the object. If a stroke occurs, the additional objects designated by the stroke are highlighted 35. When the pen is raised, the system recognizes that a selection has occurred and selects 34 all highlighted objects.

The system then looks for the pen again while it has a selection and again determines 38 the orientation of the pen. If not in the selection orientation, the system determines 45 whether the pen has been put down on the display or pulled away. If on a selection 41, the drag/drop process is activated 42 otherwise the selection is released 43. Activation starts a process represented by displayed information or an interface element.

When the pen arrives in the selection orientation, the selection mode is indicated and the system awaits a movement 45 of the pen down to the display or away from the display. When the pen comes down but not on the existing selection 46, the system starts 47 the additional selection. If on an existing selection, the system shrinks 48, the existing selection.

Figure 4:
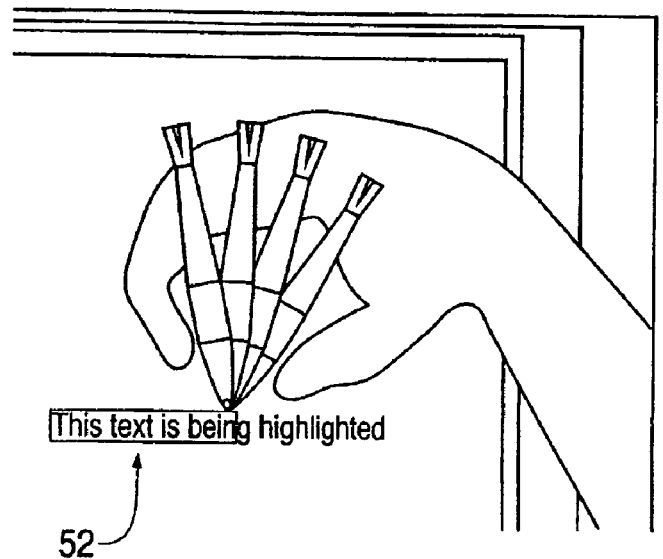
FIG. 4 depicts highlighted text.

While the pen is held near the display in the orientation noted above in step 30, the appearance of a select icon 50 (see discussion below) is modified to indicate the selection mode as shown in FIG. 3. Upon pen down as in step 32 in the selection orientation, "highlighter ink" or highlighting 52 appears as shown in FIG. 4. When the pen is returned to the writing orientation and pen touches down outside the selected area, the selection is released and writing 54 (see FIG. 5), or location-implicit selection, ensues.

In the first selection mode mentioned above, when the pen approaches the display over an element which is set for and the system knows to have a special response to input events, and which is called an object, the input events are passed to that object, such as a writing tool. When the pen touches down and subsequently moves beyond a distance threshold of the object before coming up, the mode is switched back to writing and subsequent events are no longer passed to the object.

When events are passed to objects, the objects will determine which behavior is to occur.

In cases where the objects are "pen-aware", they may respond to the approaching pen by highlighting, and respond to pen down and pen strokes by activating other pen-related processes, such as recognition, and upon a stroke may suppress or "undo" some or all of the subsequent writing (which continues unless suppressed).

One set of such objects is, for convenience, called the core task tools (see FIG. 6). These core task tools are easily recognizable by using an icon that a user will recognize as related to the task. As an example, FIG. 6 illustrates a writing tool with an icon graphically showing a cup 62 of writing instruments. FIG. 6 shows the tools completely visible. Normally when the pen is not in the vicinity of the tools the tools are partially obscured behind the edge 14 of the paper 15 and partially visible in the tool region 16 as shown in FIG. 7A. The core task tools are constantly provided, presented or available to the user by being always visible in the tool region 16 while minimizing disruption of the user's focus on the content of the "paper" page 15. The availability of all core task tools is dependable because they are always visible and always located in the same place. The core task tools share space effectively with the content, by appearing partially hidden by or behind the content until approached by the pen (in the air above the screen), at which time they come fully into view, and after the pen leaves, the tools return to the partially-hidden appearance. Preferably, the core task tools are selected directly from the tip of the pen (without appearance of a cursor). That is, the location of the pen tip over an icon will select the tool. The tools, as depicted in FIG. 7B, further optimize the sharing of screen space with content through combined use of minimally sized, irregular shapes that avoid obscuring the underlying content as much as possible; transparency within their overlying shapes to preserve an impression of the underlying content; and fading between the full and partially-hidden appearances, which both removes the suddenness experienced by the user in transitions, and reinforces the relationship between the full and partially-hidden appearances.

The preferred embodiment of the core task tools is a set 68 of core task icons and related Pop-ups which are also unique in their appearance and in the functions they represent. As depicted in FIG. 8, the tools preferably include: 1. Write (70) which when activated offers pen tips and a color palette; 2. Type (72) which toggles to show/hide a typewriter ribbon which displays character recognition results of the ink on the current page; 3. Select (74) toggles to/from select mode, and provides the user with cut, copy and paste functions; 4. New (76) which presents a new page for use by the user which icon is a "dog-eared" page and allows the user to select from among lined, blank, quadrupled, etc. types of "paper" pages; 5. Flag (78) which allows users to add markers and links, add the current document to stacks, choose whether to keep a static/local or updated/remote link; 6. Find (80) which allows the user to find an object in the current page, document, stack, or book; and 7. Send (82) which allows the user to send mail, fax, print, etc. Additional core task tools not shown in FIG. 8 include 8. Dog-ear (236—FIG. 17) superimposed on the corner of the page and shows/hides a page index and allows the user to flip to previous and next pages; and 8. Stacks (300—FIG. 28) each of which toggles to show/hide an index card, and offers back and forward flipping among documents.

The process 100 associated with the core task tool display, as shown in more detail in FIG. 9, involves obtaining the pen location from the digitizer grid control process of the computer and determining 104 whether the pen is within a predetermined threshold distance of or in the region 16. Note that this includes the pen being in the air above the display and not touching the display. When the pen over the tool is detected, the raising or bringing forward of the tool needs to start if it has not. If the tool raising has not started 106, a determination 108 is made as to whether the pen has been pulled away or down outside the proximity of the tool. If the pen is still up and over the tool 110, the raising of the tool starts 112 resulting in a display as in FIG. 6. If the raising of the tool has already started, a determination is made 114 as to whether the pen has been put down on the display or pulled away. If pulled away, the tool fading starts 116 resulting in a sequence as shown in FIG. 7B then FIG. 7A. When the pen is put down on the tool, the tool is highlighted 118. While the tool is highlighted a determination 120 is made as to whether the pen has been pulled up or away. When the pen is pulled up the tool (or the process associated with the tool icon) is started 122.

Figure 10:
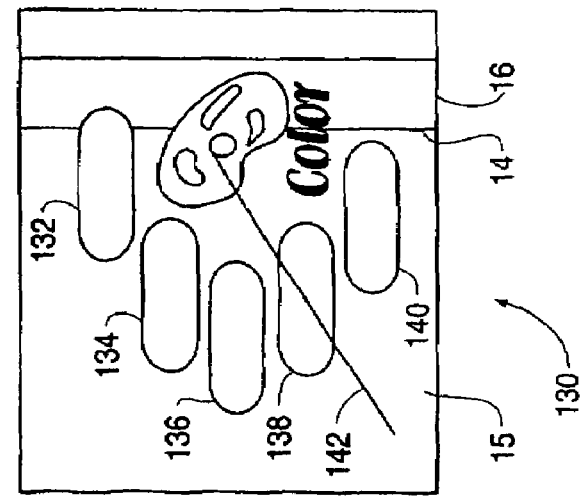
FIG. 10 shows a palette, radial marking, pop-up menu.
Figure 11:
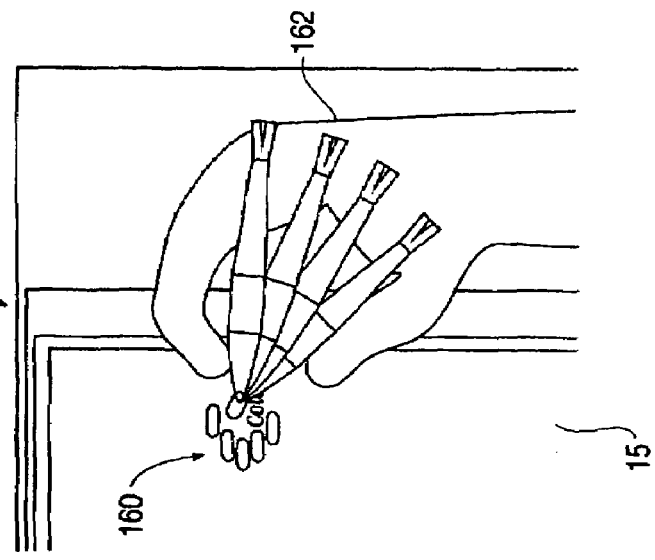
FIG. 11 illustrates a marking menu associated with a right-handed user.
Figure 12:
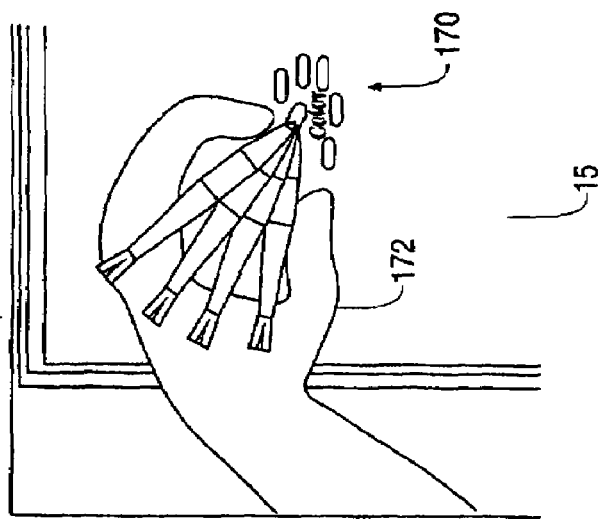
FIG. 12 illustrates a marking menu associated with a left-handed user.

One of the types of tools available in the interface is commonly called a radial marking, popup menu. In such a menu the selection of the menu item is governed by the direction of a stroke across the display generally from a starting point in a vicinity where the icon is located. U.S. Pat. No. 5,689,667 (incorporated by reference herein) describes how such menus are used to make such stroke based selections. FIG. 10 depicts an example of other such menus as in the present invention, and particularly shows the color palette selection radial marking menu 130 which allows the user to select from among five ink colors 132, 134, 136, 138 and 140. This menu 130 is shown near a right hand side of the display 10 but could be located near the left, top or bottom or other positions within the page as well. After the menu 130 is activated by one of the techniques discussed above, if a stroke by the input pen is made in a direction as indicated by the stroke line 142, the color 138 is selected. Such radial menus as in the present invention are laid out according to the handedness of the user, and may be positioned near the edge of the display region, corresponding to the handedness particularly at the edge 14 of the paper 15, as shown in FIG. 10. Their layout and position for visibility in relation to the hand is such that the user's hand does not block the user's view of the selections as depicted in FIGS. 11 and 12. In particular, the items in a radial menu such as the palette, according to the invention, are positioned, according to the invention for visibility in relation to the hand, and radially for acceleration via pen strokes, in a semicircular arrangement which in combination with cursor-less, direct use of the pen, fully maximizes the user's ability to discover and use gestures. Choices are displayed radially from the location where the pen tip first touches down, typically in a quantity of five or less such that each has an easily distinguishable compass direction, and each is plainly visible while a pen and hand are interacting with the menu. There are at least two layouts for each radical menu, one a roughly western hemisphere, the other a roughly southeastern hemisphere, in order to support left and right-handed use. The user may manually choose one layout or the other, as well as finer adjustments thereto; the system may change the layout automatically when it detects a different handedness in the pen movements and their orientations.

FIG. 11 shows a menu 160 located on a right hand side of the display 10 such that the hand 162 of a right-handed person does not obscure the choice selections when in several different selection orientations from which a stroke can be started. In particular all of the selections form a semi-circle with the curve protruding into the "page" 15 displayed. FIG. 12 shows a similar menu 170 positioned on a left hand side of the display 10 such that the hand does not obscure the selections. A comparison of FIGS. 11 and 12 shows that the hand of a left handed, western writing person is generally in a different position than that of a right handed person and, as a result, the semi-circle of the menu 170 may be somewhat compressed and oriented downward toward a corner of the display.

The display of the right-handed or left-handed versions of the menu can be controlled by a prior selection of the user by setting a preference or by determining the orientation of the pen in the user's hand during writing when the pen is in a normal orientation for the user. The two-stroke menus discussed herein can also be oriented for left and right handed people and the orientation would be determined in the same way.

With the menu items oriented in a semi-circle as in the menu 170 and radially, and the making of selections via pen strokes with a cursor-less, direct use of the pen, the user's ability to discover and use gestures to make the selections is maximized. Such radial marking menu items, none of which is obscured by the pen or the hand, are displayed radially from the location where the pen tip first touches down, with a preferred maximum quantity of five selections, each choosable with a single stroke whose path is indicated graphically. When this type of menu is used as in the present invention, there is no cursor; the pen tip is the sole representative of position and items on the screen are preferably highlighted when the pen passes over them to indicate their availability for selection.

Figure 13:
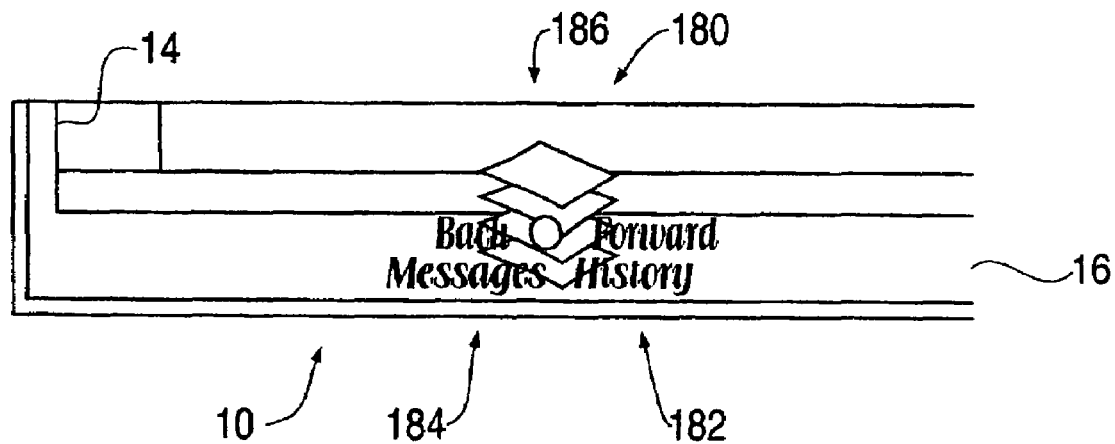
FIG. 13 illustrates a two-stroke marking menu.

Another of radial marking pop-up menu in the present invention is a two-stoke menu 180, an example of which is depicted in FIG. 13 located along a bottom edge of the display 10. This two-stroke menu 180 provides the same radial access to choices, but the choices are constrained to only two choices 182 and 184 which are opposite in both function and position, so that if one of the choices is obscured by the pen, the user can still (implicitly) know of the opposite choice and correctly anticipate the hidden choice's behavior. Selection is limited to the two choices, such that a stroke of any kind on one side of a center 186, will select the choice for that side. Although these menu items 180 are shown along the bottom of the display, they can be located along the sides or top or anywhere on the page.

The icons for both the palette and two-stroke type radial menus can exhibit alternative behaviors when the pen leaves the display surface without selecting a menu item, including but not limited to: toggling the system in/out of a mode (such as selection); and toggling to show/hide an alternative pop-up (other than the menu) for related, more permanently-displayed functions, such as dialogues.

Human visual perception of objects, and of relationships between objects, is wholly dependent on how light reflects and/or emanates from (radiates from or passes through) those objects. In the real world, the shadow is a uniquely valuable clue as to the relationship between a pair of objects, because it is not a property of either object alone but of their combination. The human visual system recognizes shadows as indicating 1) space between two objects, and 2) a foreground/background relationship. Like the real- world windows after which they are named, the objects in computer graphical user interfaces have been given borders, even to excess, in order to separate them from their surroundings. Shadows offer a fundamentally clearer approach. One reason is that a shadow changes the appearance of the object on which it is cast, but does not replace it. A shadow is a dark, weakly saturated color that is blended with the background object and has the shape of the foreground object. Thus, the computer system must deal with the process of blending. Techniques for blending the background object with the shadow cast on it are well known, including alpha-blending within a pixel (in which the value an object alone would give a pixel is simply averaged with the value the shadow alone would give it), and dithering (in which alternate pixels are taken from alternate sources and the eye does the averaging, although at lower resolution). However, to design a user interface around shadows is to assume the computer to have one or more of these blending capabilities. The present invention including shadow outlines makes that assumption. The fundamentals of a shadow outline are that it 1) exist entirely outside a foreground object, 2) modifies, even degrades, the image of a background object in order to support the notions of space between, and foreground-background relationship between, the two objects. The degradation of the image of the background object is preferably proportional to its proximity to the foreground object. Thus, far from the foreground object the shadow is faint, near the foreground object the shadow is dominant. There are many techniques by which the shadows can be algorithmically created; the use of any such algorithms to separate graphical user interface elements of a computer system fall within the scope of the present invention.

Scrolling is the predominant means of moving through electronic content today. But with a display sized and shaped for holding a page, and with enough resolution to include what people expect in a page of paper, flipping through content as discrete pages becomes important. The invention includes two interface tools: the dog-ear and the stack, which are designed to facilitate the use of the system like pages of paper relatively loosely arranged on in a bundle such as in a note book or stack. The two-stroke type tool, as depicted in FIG. 13, is used to leverage the natural metaphor of flipping pages. Animation of turning pages is used to reinforce this. A scrolling tool is also provided which allows multidirectional scrolling.

The function of the dog-ear, a page flipping tool, is simply to let the user flip to the next or previous page (screen full) within the current document, and to next and previous documents in a stack if a predominant sequence exists. An associated page number menu can be used to jump to any other page in the current document.

Figure 14:
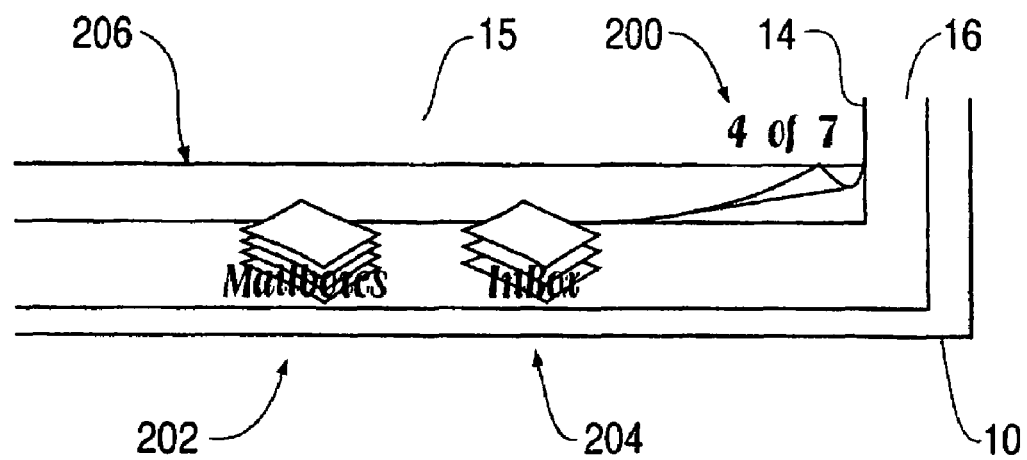
FIG. 14 shows a page flipping tool, a page scrolling tool and stack tools.
Figure 15:
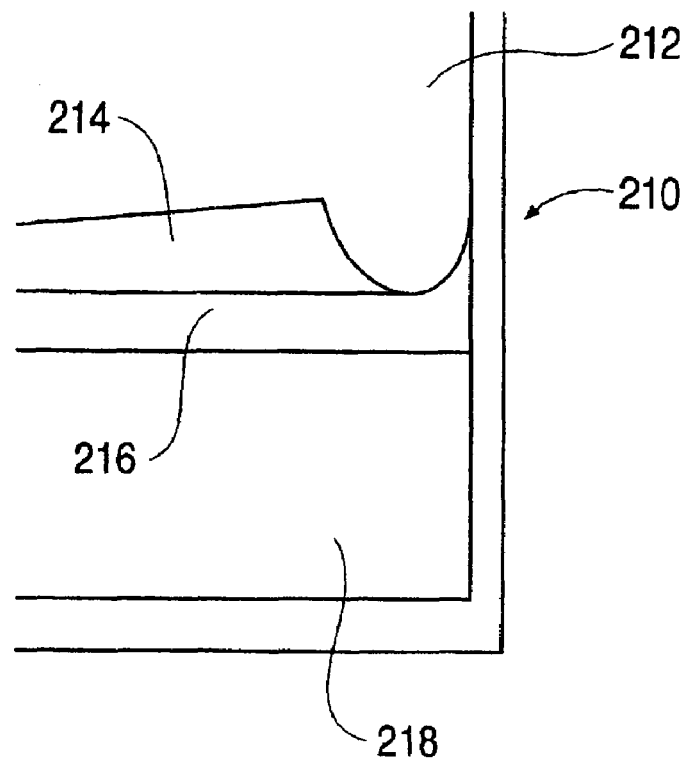
FIG. 15 depicts page flipping animation.

The function of a stack is to facilitate moving forward and back in a sequence, typically another sequence, of documents. The sequence can be a browsing history, an alphabetical index, or any other useful list. Given this function for stacks, being able to "organize" documents by dropping them onto one or more stacks, at once captures the manipulability of shuffling paper and extends it by offering multiple sets and sequences, while avoiding the containership of metaphors such as files and folders. Both a dog-ear 200 and two stacks 202 and 204 are depicted in FIG. 14. This figure also illustrates an optional tool called a scroll shadow 206 which when activated causes the page to scroll to reveal what is beyond the shadow. The dog ear 200 indicates that the current page being displayed is page four of a total of seven pages. As noted above, animation is used to present the impression of flipping a page when the dog ear is activated. During such an animation sequence for a single page flip, at different stages approximately ten images of the page being turned are displayed, with the same images being used for a forward or backward flip but in an opposite sequence. FIG. 15 shows an image 210 approximately one-half of the way through a page flip animation sequence. As can be seen, the front side 212 and the back side 214 of the page are both shown. A shadow region 216 under the page being flipped, as well as a partial view of the page 218 underneath, are shown to enhance the perception of a page flipping.

Figure 17:
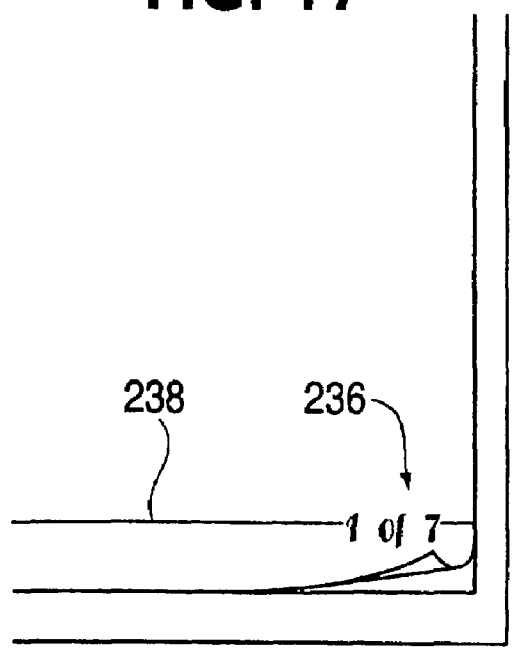
FIG. 17 depicts a highlighted dog-ear.

The process 230 performed associated with the flipping of pages using the dog-ear and scroll shadow tools, as well as other tools, is shown in FIG. 16. The first operation is to render 232 the current page contents and then render 234 the dog-ear 236 and scroll shadow 238, as illustrated in FIG. 17.

When a pen event is detected 240, several different actions can be taken depending on the type of event. If the pen approaches the dog ear 236, the back side 242 of the dog-ear 236 is highlighted 244 as well as the shadow 246 on the next page as shown in FIG. 18. FIG. 18 depicts the highlighted dog-ear 236 when the optional scroll shadow 238 is present while FIG. 19 shows the highlighted dog-ear 238 without the scroll shadow being present. As shown in FIG. 18, only the dog-ear 236 is highlighted. The highlighting of the dog-ear 238 indicates to the user that the dog-ear 236 can be activated.

If the pen is then brought down 248 on the dog-ear 236, a two-stroke menu 250 for selecting the next page 252 or the previous page 254 is typically displayed, as depicted in FIG. 18. This menu is displayed unless the pen leaves the surface before the menu is displayed and without making a new choice in which case the page number menu is displayed instead.

The system then awaits 256 (FIG. 16) a motion by the pen. If the pen moves toward or on the "next" menu selection 252, this selection is highlighted 258, as shown in FIG. 21.

Figure 21:
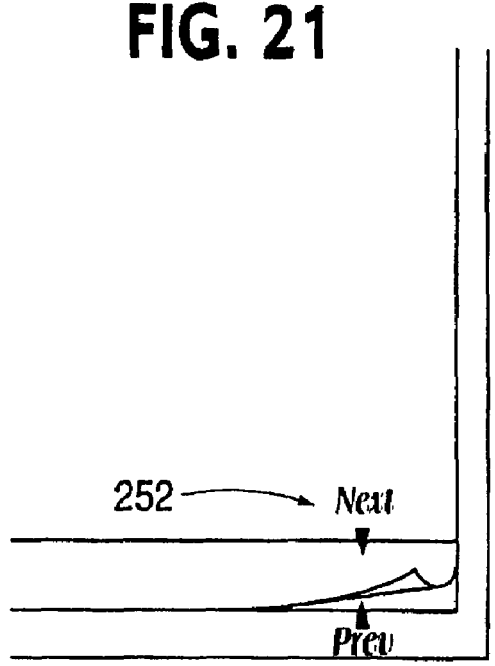
FIG. 21 depicts a menu selection.
Figure 23:
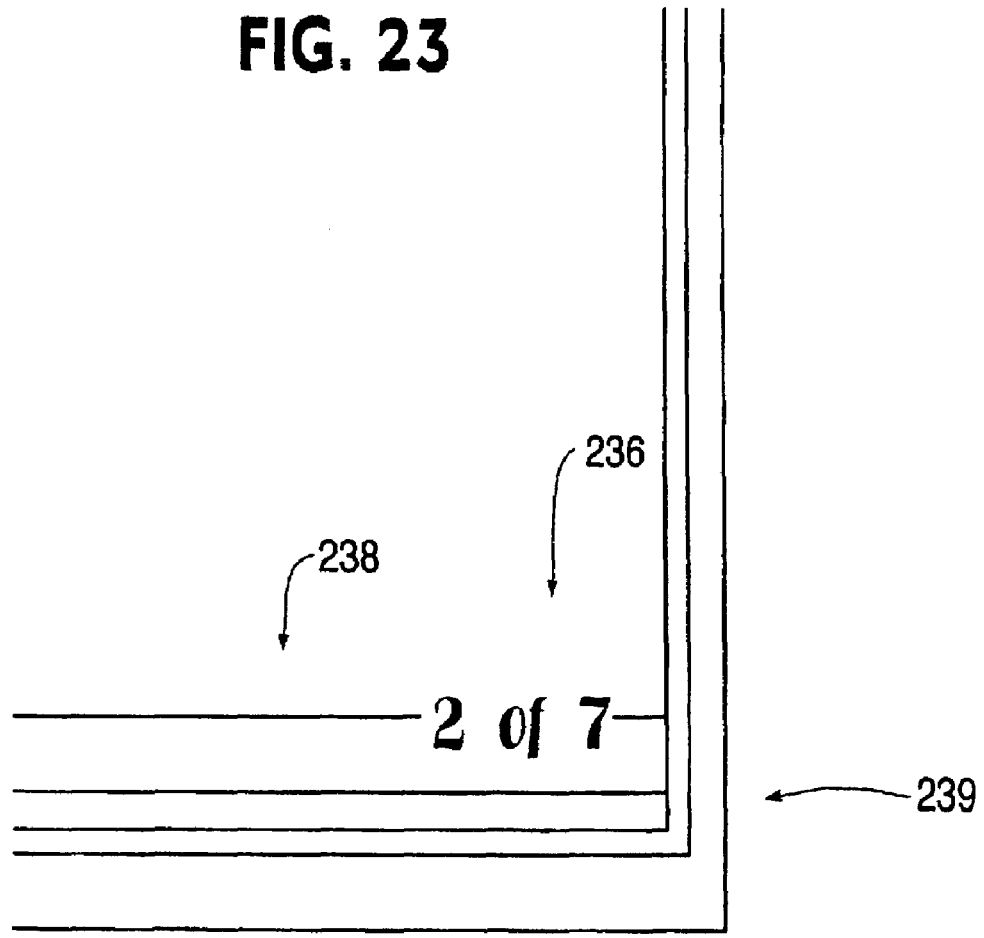
FIG. 23 shows the scroll shadow highlighted.

FIG. 21 particularly shows a "glow" type highlight 258. A glow highlight is a highlight in a color such as gold that seems to make the icon glow. It is used here as a "surround" for a selected item, it can also be used to outline an item, such as in FIG. 32 and can suffuse a item such as a scroll shadow as shown in FIG. 23. When the shadow function discussed above is applied using not a dark, weakly saturated color, but a bright, highly saturated color, it creates a specific and different impression on the eye: that of a foreground object which is "energized" and appears to cast a glow on the background object. Transitioning the outline of an object from shadow to glow provides a representation of that object's new readiness to take action when anticipating selection by the pointing device.

Figure 20:
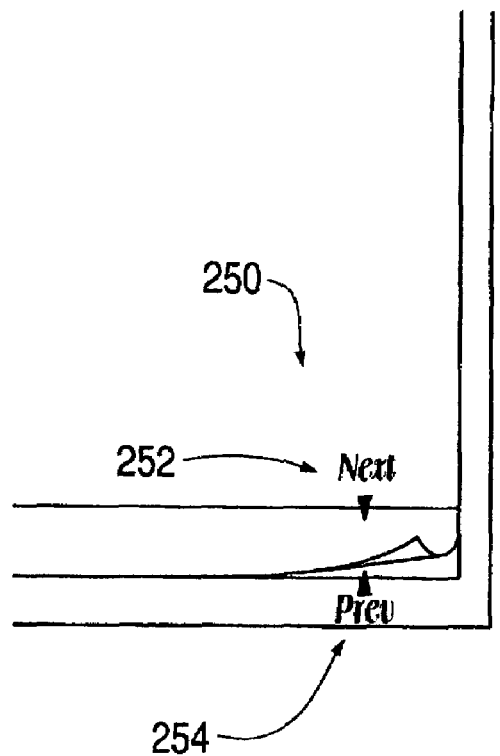
FIG. 20 shows the page flipping menu.
Figure 22:
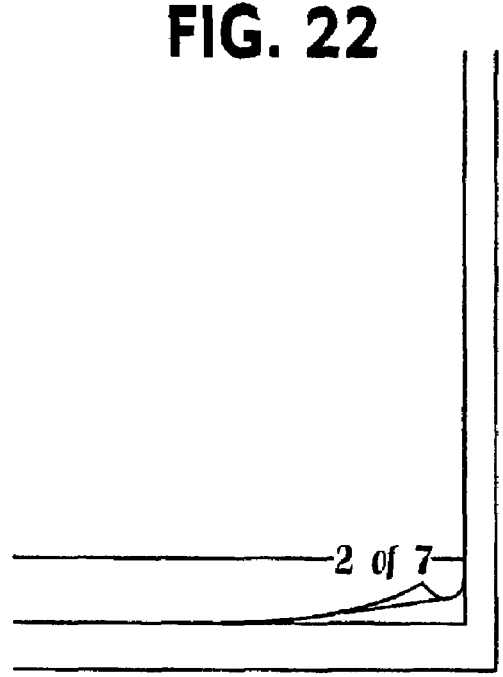
FIG. 22 shows a flipped page.

When the pen is brought up in this glow selection situation, the system changes 260 the displayed page to the next page, showing the page number as shown in FIG. 22 where the page has gone from page one (FIG. 17) to page two (FIG. 22). If the pen is moved on or over the previous menu selection 254 (see FIG. 20), it is correspondingly highlighted and when the pen is brought up in this situation, the previous page is displayed 264 along with its page number.

Figure 24:
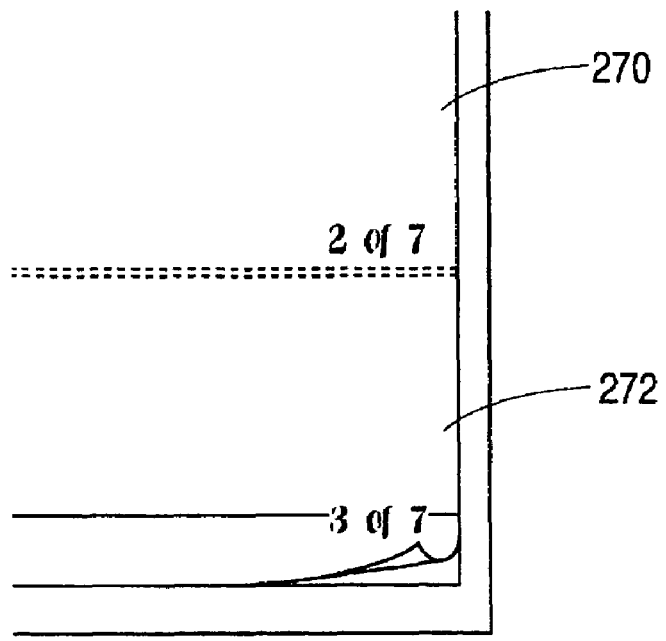
FIG. 24 shows page scrolling.

If the document is longer than one page, or if the page is larger than the display, one or more scroll shadows appear when the pen event (240—FIG. 16) is a movement approaching the scroll shadow, the entire scroll shadow 238 is highlighted 266, as shown in FIG. 23. Note that the dog-ear 236 is not highlighted. When the pen is brought down over a scroll shadow at the bottom edge 239 of the page, this causes 268 a scroll up to reveal what is below. When the pen is on the upper edge of the page, it scrolls down to reveal what is above. If the document is longer than one page then additional parts of the current page come into view. If the page is the same size as the display, the current page 270 and the next page 272 can come into view as shown in FIG. 24. To distinguish the boundary between the two pages the page numbers are shown along with a page break. A dog-ear flip to the next page in the circumstances of FIG. 24 will result in a "snap" to one of the pages being displayed.

Figure 25:
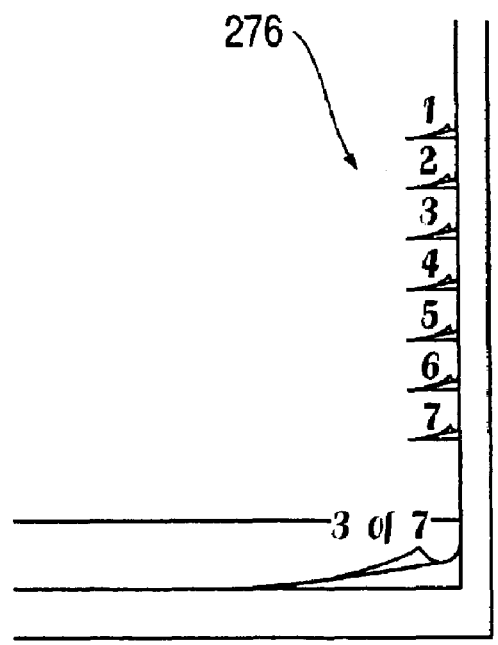
FIG. 25 depicts a page selection menu.
Figure 26:
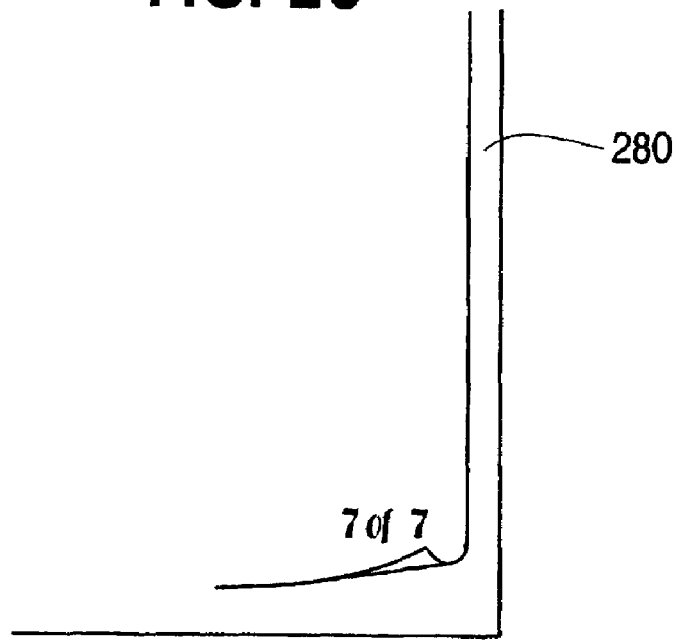
FIG. 26 shows a last page of a document.

When the pen touches the dog-ear (256—FIG. 16) and the pen is raised 274 without moving while on the dog-ear 236, a page number menu 276 showing a range of pages of the document is displayed, as illustrated in FIG. 25. The pen can be used to select one of the page numbers. When a pen event occurs 277, if a page number is selected, the page and page number are changed 278 to the selected page. FIG. 26 depicts a selection of page seven from the menu of FIG. 25. Also note that since this is the last page, there is no page beneath the dog-ear, 280 and the scroll shadow at the bottom of the page is not being displayed.

Figure 27:
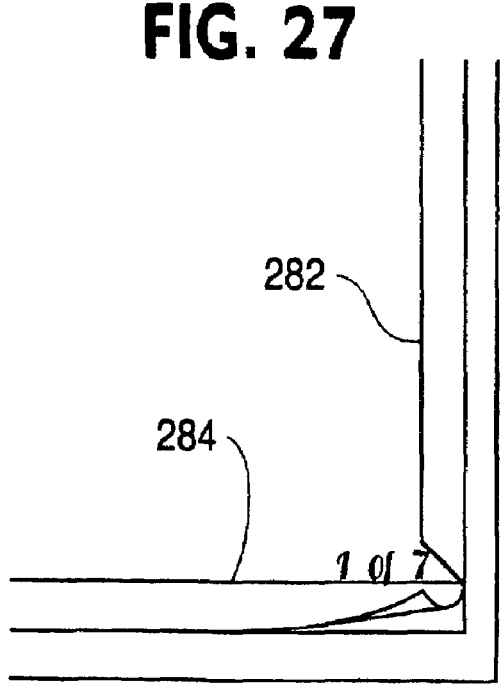
FIG. 27 shows two way scrolling shadows.

The scroll shadow can appear on two or more edges at the same time, as illustrated in FIG. 27. The side scroll shadows 282 scrolls the document sideways (left and right) while the top and bottom scroll shadows 284 scroll the document vertically (up and down). A side scroll shadow 282 appears when the document is wider than the page display, such as when a spreadsheet is displayed or a page is magnified in a zoom condition.

As previously mentioned, the function of a stack is to facilitate moving forward and backward in a sequence of documents. The sequence can be a browsing history, an alphabetical index, or any other useful list. Given this function for stacks, being able to "organize" documents by dropping them onto one or more stacks, at once captures the manipulability of flipping through paper and extends it by offering multiple sets and sequences, while avoiding the containership metaphors, such as files and folders. A collection of documents is put in a sequence, given a name, and represented as a stack. FIG. 28 depicts four stacks placed in the stack tool area 298 located, preferentially, at the bottom of the display 10 in the tool region 16. The stacks shown include stacks for notes 300, topics 302, history 304 and in-box 306.

Figure 29:
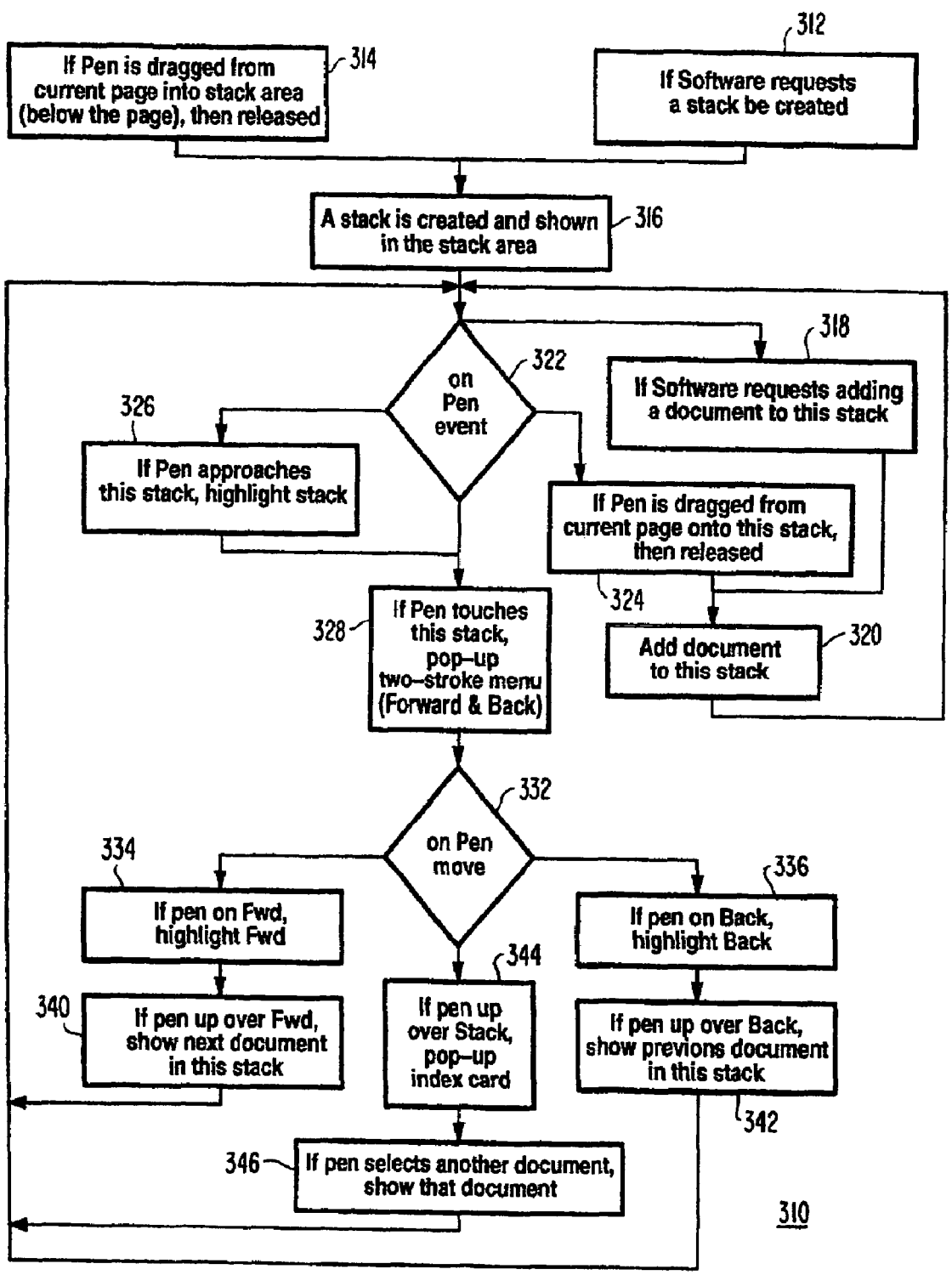
FIG. 29 illustrates a stack process.

The process 310 of operating with stacks is shown in FIG. 29. A stack can be created by the system software based on a system request 312, such as when several e-mail messages are received in an in-box. The user can drag 314 a current page into an empty portion of the stack area and release it. In both the system request and the user drag cases, a stack is created 316 in the stack area 298. After a stack has been created, the system or the user can request 318 the addition of a document to the stack and the document is added 320.

Figure 32:
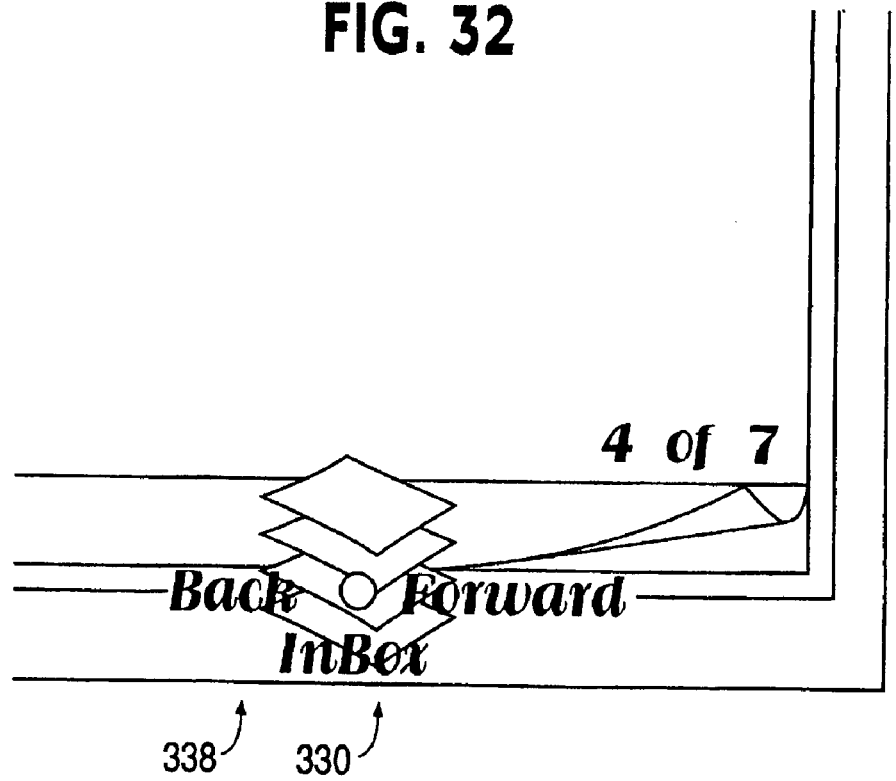
FIG. 32 illustrates a menu selection.

In general stacks respond to the pen in essentially the same manner as the dog-ear. Upon a pen event 322 (FIG. 29), if the pen is used to drag 324 a document to a stack, it is added 320. If the pen is brought 326 near a stack 306 it is brought to the foreground as shown in FIG. 30 and expanded over the edge 327 of the page 15 highlighting the stack. If the pen event is the touching 328 of a stack, a two-stroke menu 330 appears. Upon a pen move 332 which is on or toward one of the two menu choices, the choice is highlighted (334/336) as shown in FIG. 32 by the highlighting of the backwards menu choice 338. When the pen is released over the menu choice, the page flips in an animated sequence, as previously discussed, and the next document in the stack is shown (340/342—FIG. 29) where the previous one was. If the pen is raised while over the stack, (or the stack is tapped and released without a stroke), an index card 344 (see FIG. 33) is displayed 344. This card 344 provides a list of documents in the stack with the current document highlighted. When the pen is released 346 over one of the listed documents, the display flips to the selected document in an animated sequence and the chosen document is shown as the main page. If there are more documents in the stack than can be shown on the card, scroll shadows appear at the bottom and/or top of the card 344.

Figure 31:
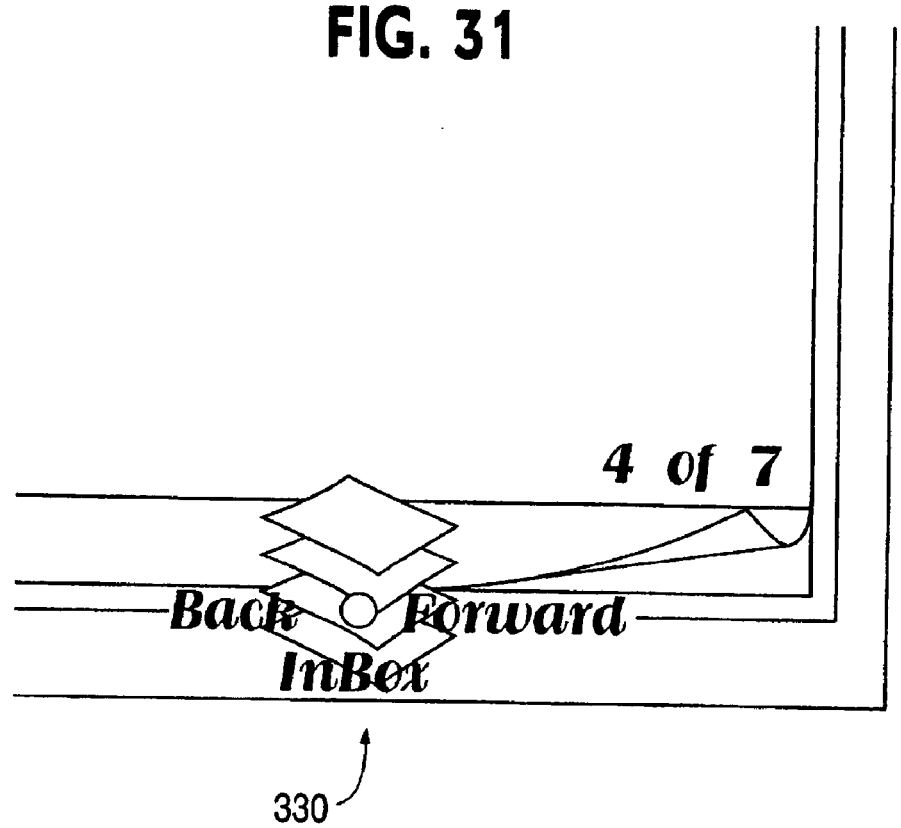
FIG. 31 depicts the stack two stroke menu.

Another tool provided by the present invention is called, for convenience, a typing tool or typing ribbon 360 as depicted in FIG. 31. The ribbon preferably includes several types of zones: A set of writing zones 362 where the user writes strokes that are to be converted into typed characters. The writing zones are 362 large enough (height and width) to support natural western writing. A set of special character zones 364 where the user can select special characters for entry into the typed text, such as tab and enter. A typed text region of the page, 366 where the typed characters of the written text appear as the user is writing. This zone 366 is part of the displayed page and edits a line on the page. That is, the handwritten text in zone 362 appears on the page in zone 366. A cursor 368 is also displayed and indicates where the next character handwritten in zone 362 or selected from zone 364 will appear in zone 366.

Figure 35:
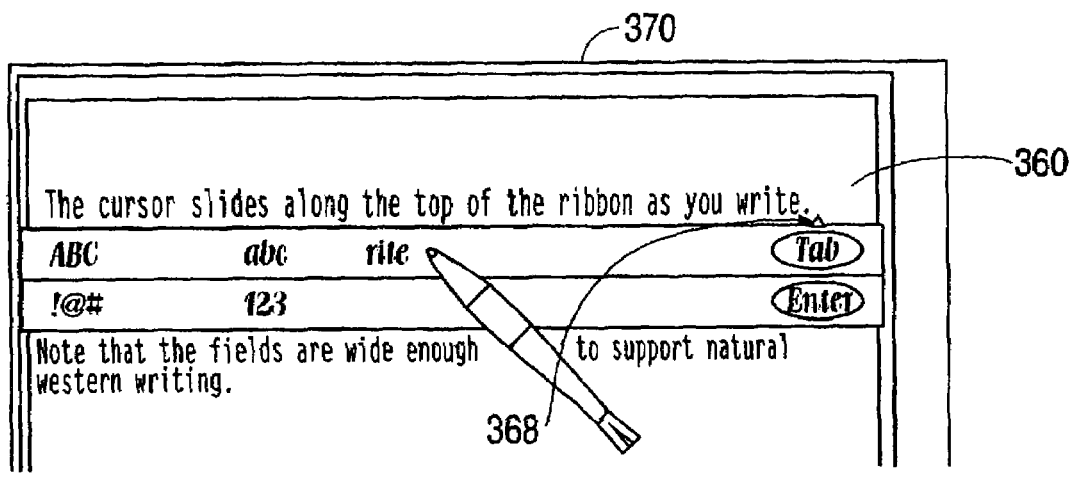
FIG. 35 shows text entry at the end of a text line.
Figure 36:
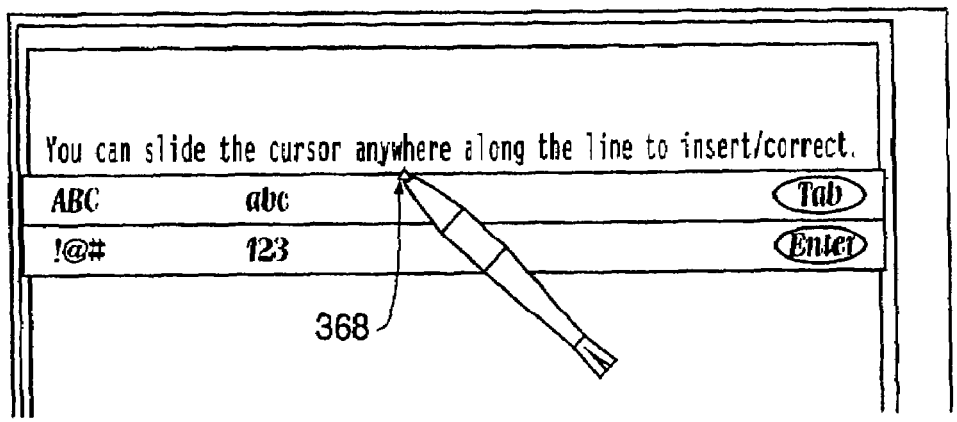
FIG. 36 shows text entry in the middle of a text line.
Figure 37:
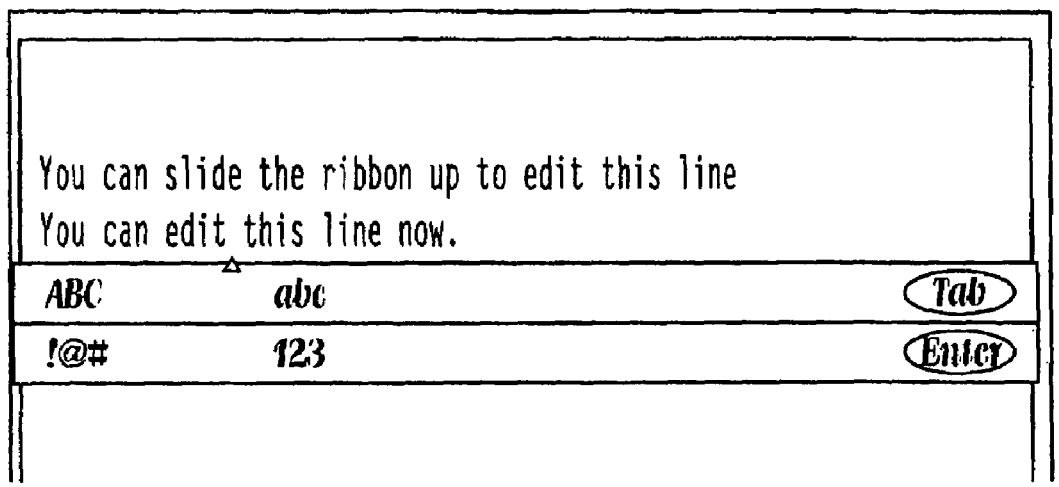
FIG. 37 shows the typing tool moved to edit a different line of text.

The writing zone 362 runs "horizontally" underneath the text line in the zone 366 which it is editing (just like a typewriter ribbon). Handwritten strokes written on the ribbon in the zone 362 are sent to a conventional handwriting recognition system, with output of the recognizer targeted, in real-time, at the cursor location (or a selection to be replaced) on the text line above the ribbon which line is located within the page of the document being displayed. FIG. 35 illustrates the preferential size of the ribbon 360 as spanning the entire width of a displayed page 370. This figure also shows writing at the end of a typed text line. The cursor 368 can be moved across the line by dragging it with the pen to point to text that needs to be edited or corrected as illustrated in FIG. 36. When a different line of text is to be edited, the pen can be used to drag the ribbon 360 up/down to the desired text, as illustrated in FIG. 37.

Figure 38:
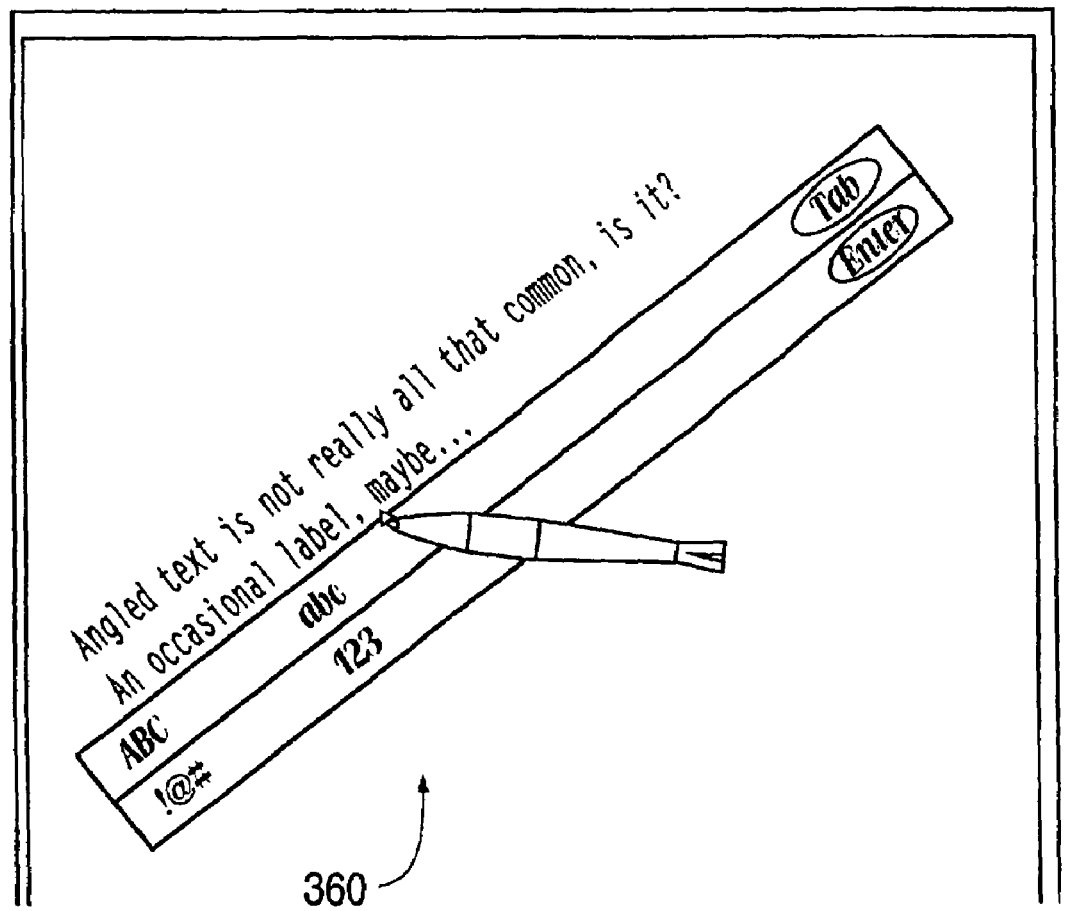
FIG. 38 shows a non-horizontal typing tool.

The ribbon 360 can also be rotated to a diagonal orientation, as shown in FIG. 38, (to associate with a diagonal line of text) by similarly rotating the pen while dragging the ribbon. In addition to more closely associating with diagonal text, this helps the recognizer by telling it more precisely which way is up.

We have recognized that the sequencing of experience is fundamentally important in Human-computer interaction. The world wide web offers such complexity in navigation that effective browsing would be nearly impossible without a back button. By the sequence of experience, we mean what the user perceives to have happened recently, to be happening now, and to be expected in the future, presented and best thought of as stepping with the option of viewing before stepping. It is perhaps best thought of as a combination of viewing and stepping.

The sequencing of experience has been supported in fragments scattered throughout the prior art of computer-human interaction. The list includes Dialog boxes, with their myriad variations on OK and Cancel; the Edit menu with its Undo and Redo items; Graphical User Interfaces with their various scroll bars; and myriad viewing and stepping options using the keyboard's enter and escape, home and end, arrow and page keys, function keys, and modifier-based shortcuts.

Figure 39:
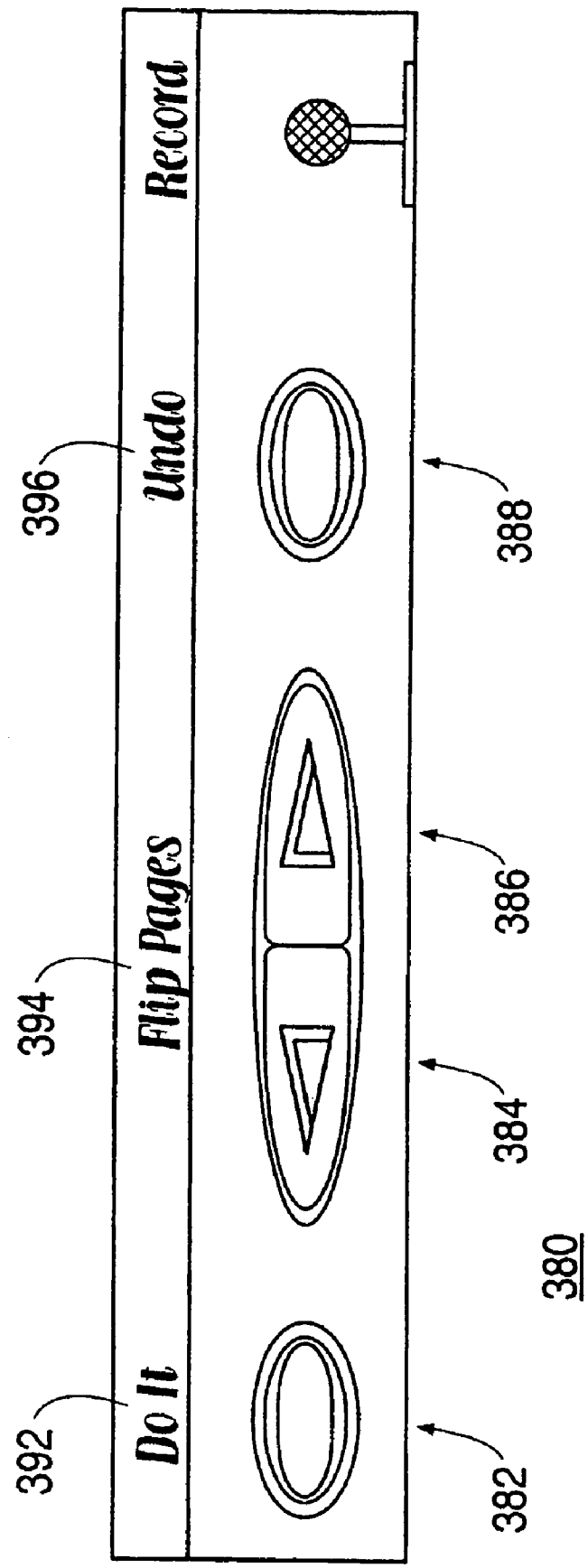
FIG. 39 illustrates control buttons.

The present invention, as depicted in FIG. 39, includes an arrangement of buttons (button tools 380), and a relationship between them and the display of a handheld computer system, which optimizes the system to support the sequencing of experience.

Two pairs of buttons 384/386 and 382/388 are arranged vertically along one of the side edges, where the display is most naturally held for reading, in close proximity to the display (within 10 mm) to support on-screen labeling. The buttons are sized, shaped and recessed so as to be easy to find and depress intentionally (specifically, with a thumb edge while holding it, and with a thumb tip or fingertip while it rests on a surface), and unlikely to be depressed accidentally while handling for other reasons (specifically, with a palm while carrying it or with the heel of a hand while writing on it). The visually dominant pair of buttons 384/386 is designed to convey that they are paired, opposite in function, and up and down in direction, without the use of words or icons which could conflict with on-screen labels. The function of the central pair 384/386 is to support viewing, and in particular, viewing pages and viewing where to step, and the myriad semantic variations thereof. The secondary pair of buttons 382/388 is designed to convey that they are also paired and opposite in function. The function of the secondary pair 382/388 is to support stepping forward (i.e. follow a link, confirm a dialog) and back (i.e. undo a mistake, cancel a dialog), and the myriad semantic variations thereof. The secondary pair 382/388 is preferably spaced close enough to the visually dominant pair for a user holding the system to access them by only rotating the thumb away from either button of the visually dominant pair (specifically, without having to adjust the location of the fingers), while far enough away and different enough in shape to be quickly and easily distinguished by thumb feel. The display area nearest the buttons may be optionally used for labels 392, 394 and 396 for the buttons An additional button may optionally be placed adjacent to the four buttons and the display, for similarly ergonomic control of audio input functions, including recording, conferencing, and recognition.

These button tools 380, can be provided either in the form of physical buttons mounted along the side or bottom of the display, or touch-screen buttons that appear in the tool region alongside or below the displayed page. If physical buttons 382, 384, 386 and 388 are implemented (see FIG. 39) they should be both finger-and-pen-friendly, recessed in a trough and dimpled. Associated "soft" labels 392, 394 and 396 are positioned in an edge of the screen of the display. The preferred buttons include a button 382 for causing an action to occur (Go, Ok, do it . . . ), buttons 384 and 396 for viewing (i.e., flipping pages) and a button for reversing an action (go back, cancel).

The present invention has been described with respect to user interface elements as separate from and either in front of or behind, the information concurrently displayed by the system.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A display comprising:
   an information display region; and
   a typing tool approximately the width of the information display region overlaying a portion of the information display region, wherein the entire typing tool is placed at a diagonal orientation relative to the information display region in response to dragging and rotating the typing tool by simultaneously dragging and rotating a stylus by a user, the typing tool comprising a writing zone where the user hand writes strokes, a special character zone where the user selects special characters, and an immediately adjacent typing zone of the region where typed text corresponding to handwritten text of the strokes is simultaneously displayed as the strokes occur.

2. The display as recited in claim 1 further comprising a movable typed text cursor indicating where the next handwritten text will be added.

3. In a computer system including a display and an information display region, a computer-implemented method, the method comprising:

providing a movable typing tool approximately the width of the information display region and overlaying a portion of the information display region by aligning the typing tool under a first diagional line of typed text in the information display region by dragging and rotating the typing tool to a diagional orientation, by simultaneously dragging and rotating a stylus, wherein the movable typing tool comprises a writing zone; and responsive to a user inputting handwriting strokes in the writing zone, displaying the handwriting strokes in the writing zone and concurrently displaying text corresponding to the handwriting strokes in the first line of typed text.

4. The method of claim 3 further comprising providing a movable cursor indicating where a next character corresponding to one or more handwriting strokes will be displayed.

5. The method of claim 3 wherein the typing tool includes a special character zone proximate to the writing zone, the special character zone including one or more special characters for entry into the first line of typed text when selected by the user.

6. The method of claim 3 further comprising dragging the typing tool to be aligned under a second line of typed text in the information display region.

* * * * *

UNITED STATES PATENT AND TRADEMARK OFFICE
CERTIFICATE OF CORRECTION

| | |
|---|---|
| PATENT NO. | : 7,703,047 B2 |
| APPLICATION NO. | : 11/121977 |
| DATED | : April 20, 2010 |
| INVENTOR(S) | : Leroy Bertrand Keely, Jr. et al. |

Page 1 of 1

It is certified that error appears in the above-identified patent and that said Letters Patent is hereby corrected as shown below:

In column 13, line 4, in Claim 3, delete "diagional" and insert -- diagonal --, therefor.

In column 13, line 6, in Claim 3, delete "diagional" and insert -- diagonal --, therefor.

Signed and Sealed this

First Day of February, 2011

David J. Kappos
*Director of the United States Patent and Trademark Office*